United States Patent
Bai et al.

(10) Patent No.: US 12,170,636 B2
(45) Date of Patent: Dec. 17, 2024

(54) SOLVING SLOT FORMAT CONFLICTS IN FULL-DUPLEX SYSTEMS

(71) Applicant: QUALCOMM Incorporated, San Diego, CA (US)

(72) Inventors: Tianyang Bai, Somerville, NJ (US); Navid Abedini, Basking Ridge, NJ (US); Kiran Venugopal, Raritan, NJ (US); Qian Zhang, Basking Ridge, NJ (US); Hua Wang, Basking Ridge, NJ (US); Junyi Li, Fairless Hills, PA (US); Yan Zhou, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 510 days.

(21) Appl. No.: 17/449,941

(22) Filed: Oct. 4, 2021

(65) Prior Publication Data

US 2022/0116191 A1 Apr. 14, 2022

Related U.S. Application Data

(60) Provisional application No. 63/090,060, filed on Oct. 9, 2020.

(51) Int. Cl.
*H04L 5/14* (2006.01)
*H04W 72/23* (2023.01)

(52) U.S. Cl.
CPC .............. *H04L 5/14* (2013.01); *H04W 72/23* (2023.01)

(58) Field of Classification Search
CPC ....... H04L 5/16; H04L 1/1822; H04L 1/1854; H04L 1/1858; H04L 5/0048; H04L 5/0053; H04L 1/1812; H04L 5/14; H04W 72/56; H04W 4/70; H04W 72/12; H04W 72/20; H04W 72/1273; H04W 72/232; H04W 72/569; H04W 72/0446; H04W 72/23

See application file for complete search history.

(56) References Cited

U.S. PATENT DOCUMENTS

| | | | | |
|---|---|---|---|---|
| 2016/0330011 A1* | 11/2016 | Lee | ............................ | H04L 5/14 |
| 2018/0007667 A1* | 1/2018 | You | ........................ | H04L 5/0051 |
| 2018/0176000 A1* | 6/2018 | Lee | ........................ | H04L 1/1854 |
| 2019/0335441 A1* | 10/2019 | Bai | ........................ | H04L 5/0053 |

* cited by examiner

*Primary Examiner* — Dady Chery
(74) *Attorney, Agent, or Firm* — Procopio, Cory, Hargreaves & Savitch LLP

(57) ABSTRACT

An apparatus, e.g., a UE, for resolution of conflicts between HD and FD configurations is disclosed. The UE receives a configuration indicating that a first set of symbols is configured for HD communication with at least one of D symbols, U symbols, or F symbols in which the F symbols are configured as D or U. The UE receives DCI scheduling FD communication including an FD transmission and an FD reception on a second set of symbols. The second set of symbols have a third set of symbols in common with the first set of symbols. The third set of symbols have conflicting HD and FD configurations. The UE cancels, based on the conflicting HD and FD configurations of the third set of symbols, at least one of the FD transmission or the FD reception in the third set of symbols.

30 Claims, 18 Drawing Sheets

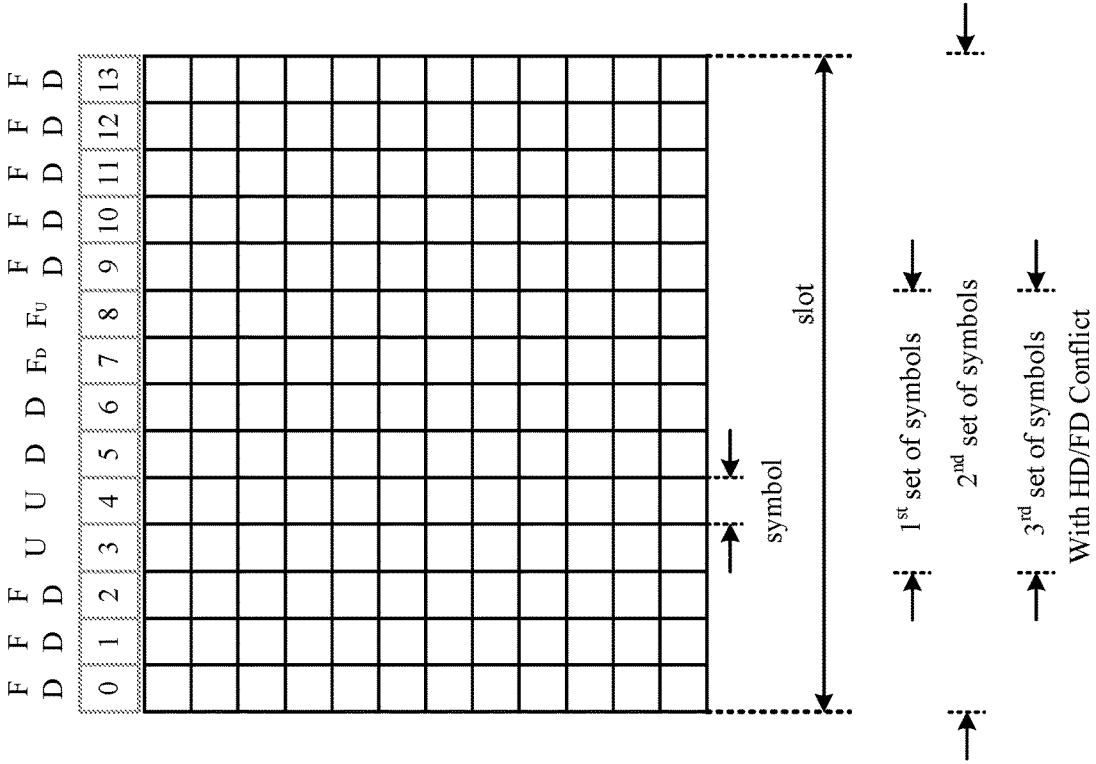
FIG. 5

FIG. 11

SOLVING SLOT FORMAT CONFLICTS IN FULL-DUPLEX SYSTEMS

CROSS REFERENCE TO RELATED APPLICATION(S)

This application claims the benefit of and priority to U.S. Provisional Application Ser. No. 63/090,060, entitled "Methods and Apparatus for Solving Slot Format Conflicts in Full-Duplex Systems" and filed on Oct. 9, 2020, which is expressly incorporated by reference herein in its entirety.

TECHNICAL FIELD

The present disclosure relates generally to communication systems, and more particularly, to resolution of conflicts between half-duplex (HD) and full-duplex (FD) slot format configurations.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus, e.g., a user equipment (UE), are provided in relation to resolution of conflicts between HD and FD slot format configurations. The UE may receive a configuration indicating that a first set of symbols is configured for HD communication with at least one of downlink (D) symbols, uplink (U) symbols, or flexible (F) symbols in which the F symbols are configured as D or U. The UE may receive downlink control information (DCI) scheduling FD communication including an FD transmission and an FD reception on a second set of symbols. The second set of symbols may have a third set of symbols in common with the first set of symbols. The third set of symbols may be a subset of the second set of symbols and have conflicting HD and FD configurations. The UE may cancel, based on the conflicting HD and FD configurations of the third set of symbols, at least one of the FD transmission or the FD reception in the third set of symbols.

In another aspect of the disclosure, a method, a computer-readable medium, and an apparatus, e.g., a base station, are provided in relation to resolution of conflicts between HD and FD slot format configurations. The base station may transmit, to a UE, a configuration indicating that a first set of symbols is configured for HD communication with at least one of D symbols, U symbols, or F symbols in which the F symbols are configured as D or U. The base station may transmit, to the UE, DCI scheduling FD communication including an FD transmission at the UE and an FD reception at the UE on a second set of symbols. The second set of symbols may have a third set of symbols in common with the first set of symbols. The third set of symbols may be a subset of the second set of symbols and may have conflicting HD and FD configurations. The base station may cancel, based on the conflicting HD and FD configurations of the third set of symbols, at least one of a reception by the BS in association with the FD transmission at the UE or a transmission by the BS in association with the FD reception at the UE in the third set of symbols.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a diagram illustrating transmission of an example slot based on one example resolution of conflicts between HD and FD configurations.

FIG. 11 is a diagram illustrating transmission of an example slot based on one example resolution of conflicts between HD and FD configurations.

DETAILED DESCRIPTION

Figure 1:
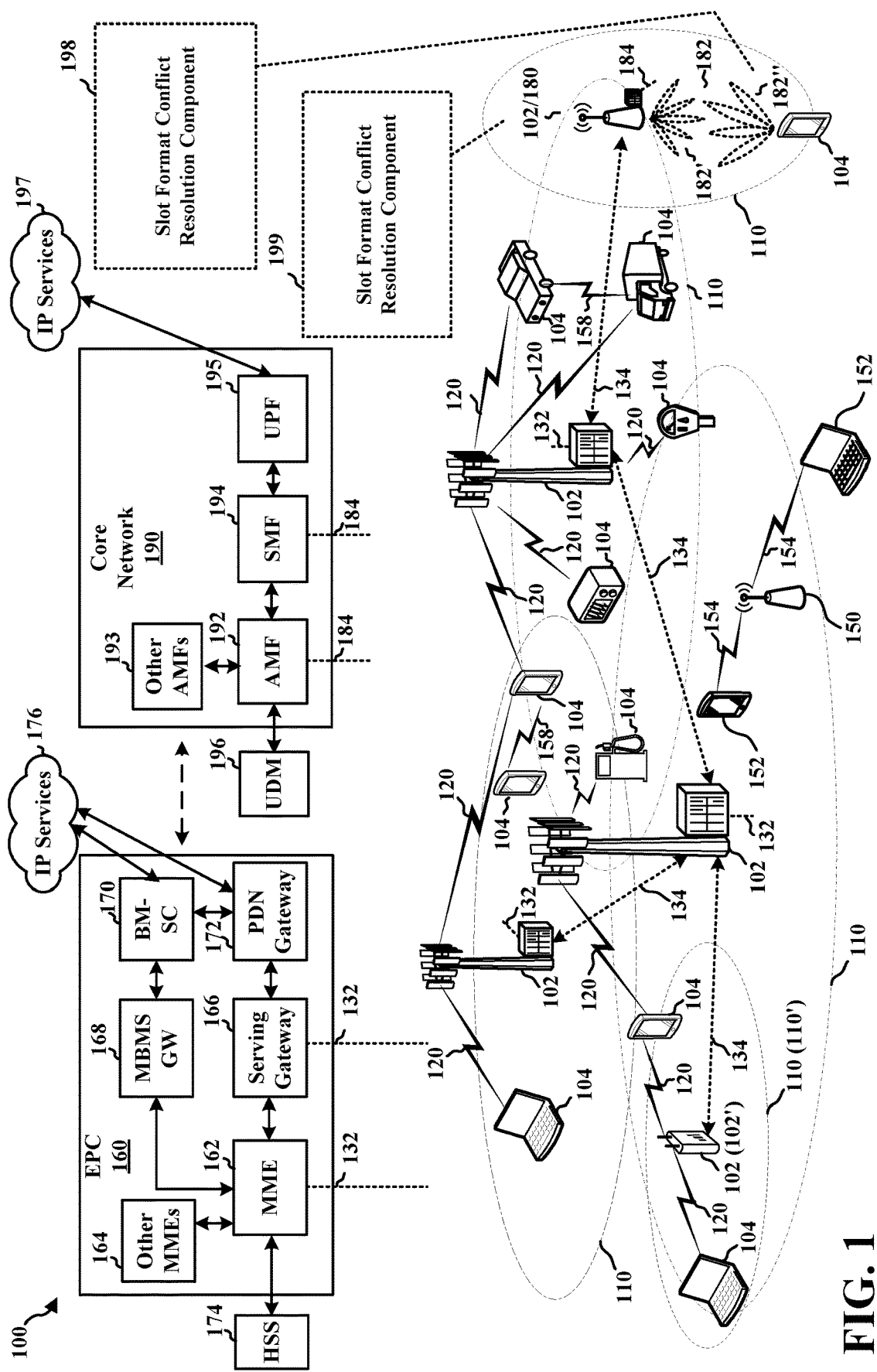
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a slot format conflict resolution component 198 that resolves the conflicts between received slot format configurations with conflicting HD and FD configuration by canceling at least part of the configured transmission or reception. The slot format conflict resolution component 198 may be configured to receive a configuration indicating that a first set of symbols is configured for HD communication with at least one of D symbols, U symbols, or F symbols in which the F symbols are configured as D or U. The slot format conflict resolution component 198 may also be configured to receive DCI scheduling FD communication including an FD transmission and an FD reception on a second set of symbols, the second set of symbols having a third set of symbols in common with the first set of symbols, the third set of symbols being a subset of the second set of symbols and having a conflicting HD and FD configuration. The slot format conflict resolution component 198 may also be configured to cancel, based on the conflicting HD and FD configurations of the third set of symbols, at least one of the FD transmission or the FD reception in the third set of symbols. In certain aspects, the base station 180 may include a slot format conflict resolution component 199 that resolves the conflicts between transmitted slot format configurations with conflicting HD and FD configuration by canceling at least part of the configured transmission or reception. The slot format conflict resolution component 199 may also be configured to transmit, to a user equipment (UE), a configuration indicating that a first set of symbols is configured for HD communication with at least one of D symbols, U symbols, or F symbols in which the F symbols are configured as D or U. The slot format conflict resolution component 199 may also be configured to transmit, to the UE, DCI scheduling FD communication including an FD transmission at the UE and an FD reception at the UE on a second set of symbols, the second set of symbols having a third set of symbols in common with the first set of symbols, the third set of symbols being a subset of the second set of symbols and having conflicting HD and FD configurations. The slot format conflict resolution component 199 may also be configured to cancel, based on the conflicting HD and FD configurations of the third set of symbols, at least one of a reception by the BS in association with the FD transmission at the UE or a transmission by the BS in association with the FD reception at the UE in the third set of symbols. Although the following description may be focused on 5G NR, the concepts described herein may be applicable to other similar areas, such as LTE, LTE-A, CDMA, GSM, and other wireless technologies.

Figure 2:
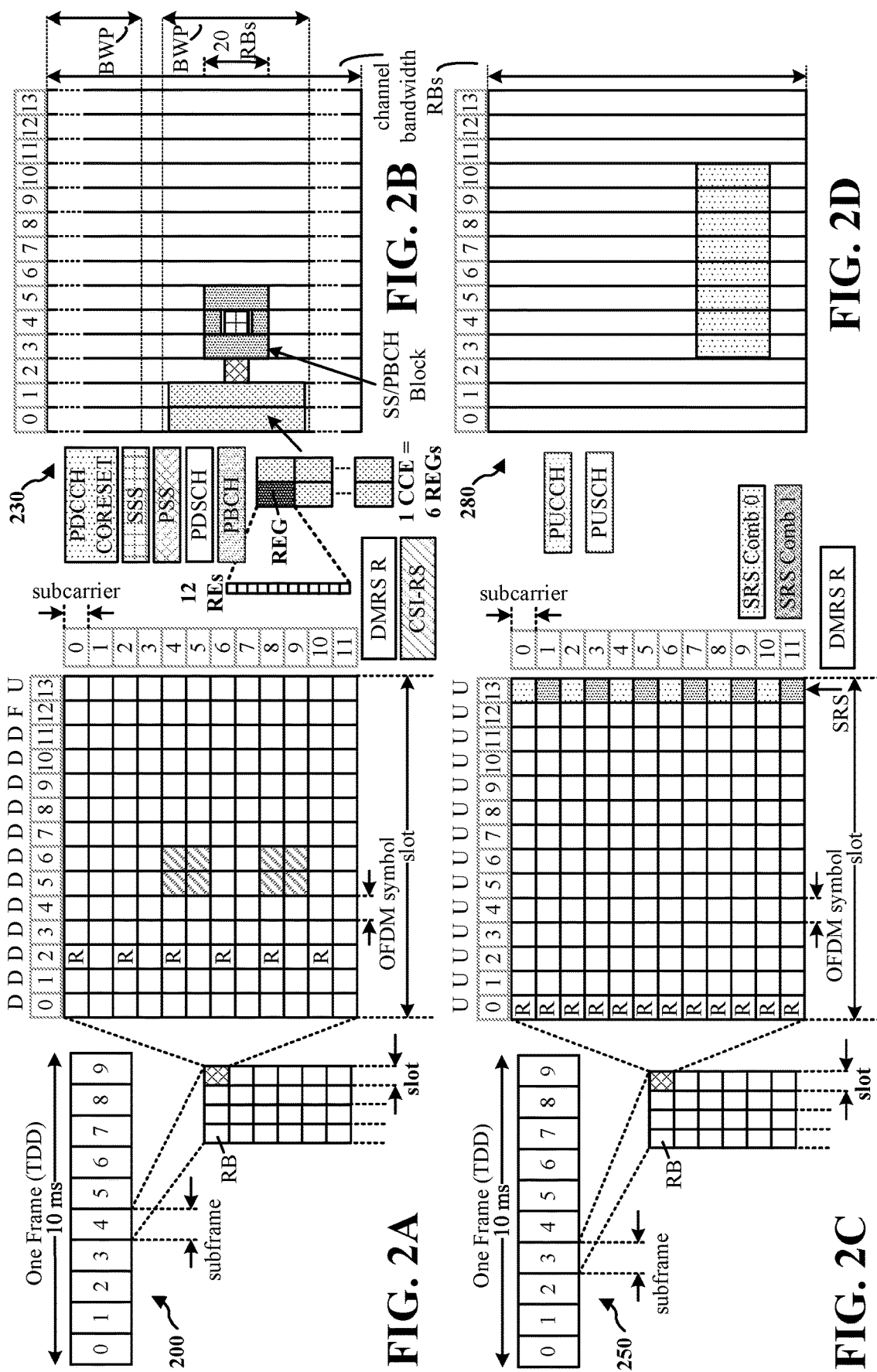
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu 15$ kHz, where $\rho$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
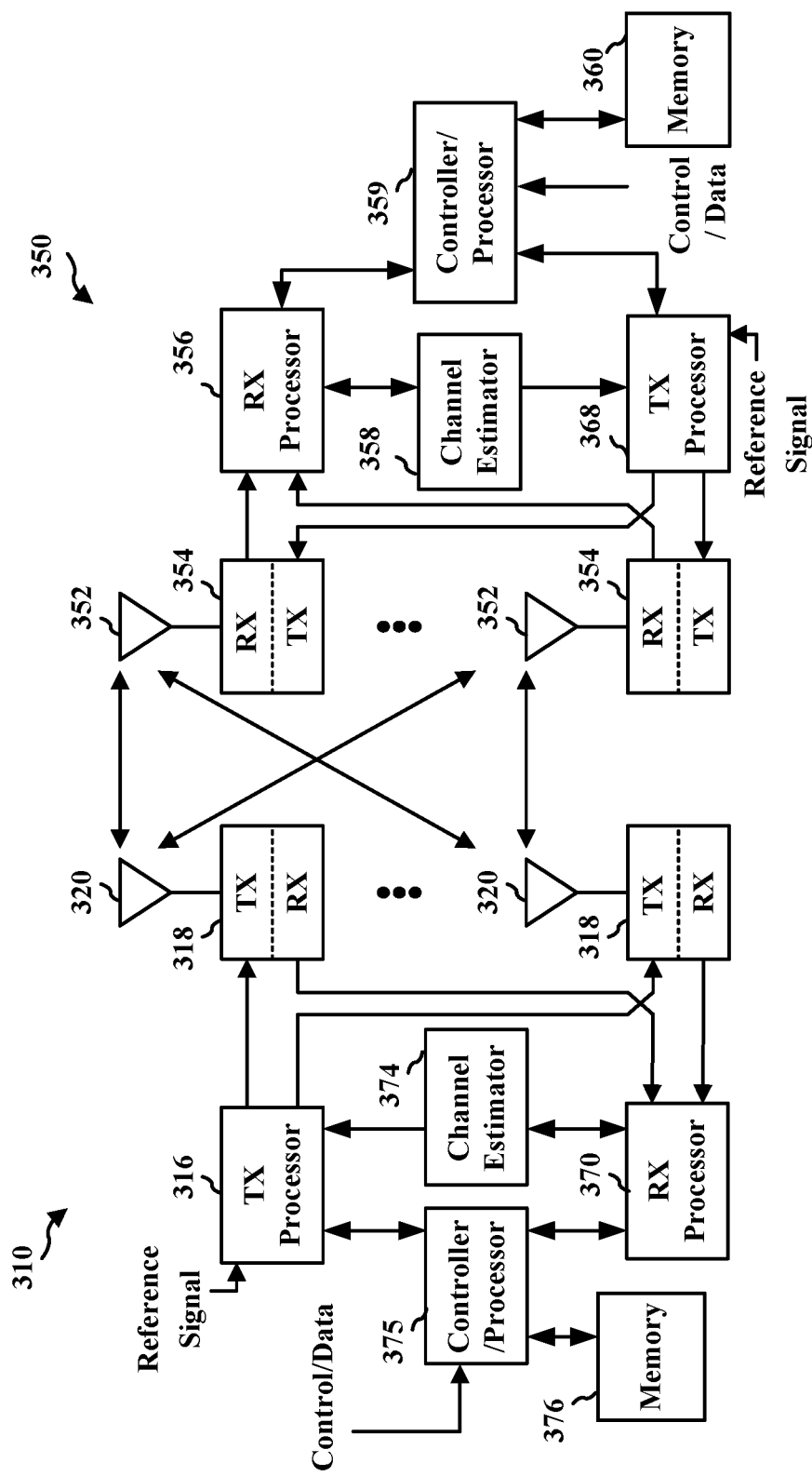
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with slot format conflict resolution component 198 of FIG. 1. At least one of the TX processor 316, the RX processor 370, and the controller/processor 375 may be configured to perform aspects in connection with slot format conflict resolution component 199 of FIG. 1.

In NR, the slot format may be defined at the symbol level. A certain slot or certain symbols of a slot may be configured as a U slot/symbol, a D slot/symbol, or an F slot/symbol. An F slot/symbol may be configured for both U and D, or for either one of U or D. The slot format may be configured through RRC signaling, or by a slot format indicator in a DCI. In particular, the slot format may be configured semi-statically with the parameter "TDD-UL-DL-configCommon" or the parameter "TDD-UL-DL-configDedicated" through RRC signaling. Further, DCI format 2_0 may include a slot format indicator usable for configuring the slot format. Sometimes, grants may schedule a conflicting direction of transmission with respect to the direction based on the configured slot format. In some aspects, there may be a specification to resolve such a conflict. For example, there may be a specification that in a DCI scheduled D slot, if at least one symbol is semi-statically configured to be U (i.e., a conflict exists in connection with the symbol), the slot may not be transmitted or received. In another example, there may be a specification that in a DCI scheduled U slot, if at least one symbol is semi-statically configured to be D (i.e., a conflict exists in connection with the symbol), the slot may not be transmitted or received.

Cellular standards have specified HD communications. In HD communications, at one time, the UE or the base station may either transmit or receive, but any particular device may not transmit and receive simultaneously. Self-interference had prevented the use of FD communications where the UE or the base station may transmit and receive at the same time. Self-interference may arise when signals propagate from the transmit antenna to the receive chain of the same device, which may occur as a result of the proximity (proxy) of the device or even reflection due to a local clutter. Self-interference from the transmit signal may be as strong as the receive signal even with cancellation techniques.

Advancements may make FD cellular communications more feasible, where the UE or the base station may transmit and receive at the same time. The transmission and the reception may not necessarily take place over the same tone. In other words, different BWPs may be utilized for transmission and reception in FD communications to reduce self-interference. FD communications may double the spectrum efficiency and reduce latency, provided the self-interference can be sufficiently mitigated or canceled. Analog cancellation and/or digital cancellation techniques may be utilized. With millimeter wave (mmW) frequencies, self-interference may be further reduced by choosing a proper uplink/downlink beam pair. For example, transmit and receive beams may be chosen from different panel/spatial directions. Good or acceptable beam pairs may be selected via a beam training process using a (simultaneous) CSI-RS/SRS sweep. In a FD setup, the base station and the UE may use two beam pair links for uplink/downlink balancing the pathloss and self-interference. Of course, if the uplink beam changes, the UE may also update the downlink beam.

A new FD slot format may be added to the list of possible slot formats. A symbol configured as FD may be used for both uplink and downlink at the same time. An F symbol may also be configured for FD communications. For a number of reasons, U and D symbols may be utilized in FD systems. In particular, some UEs may not support FD communications. The single direction transmission may be utilized by users at the cell edge because FD communication performance may be low at the cell edge. For users at the cell edge, FD communications may produce too much interference as the uplink transmission from an FD user may affect the downlink reception at the cell edge at the same time. Accordingly, FD users may refrain from transmitting in the FD mode to reduce interference to other users at the cell edge.

Based on the above, it may be beneficial to resolve conflicts between HD and FD slot format configurations.

Figure 4:
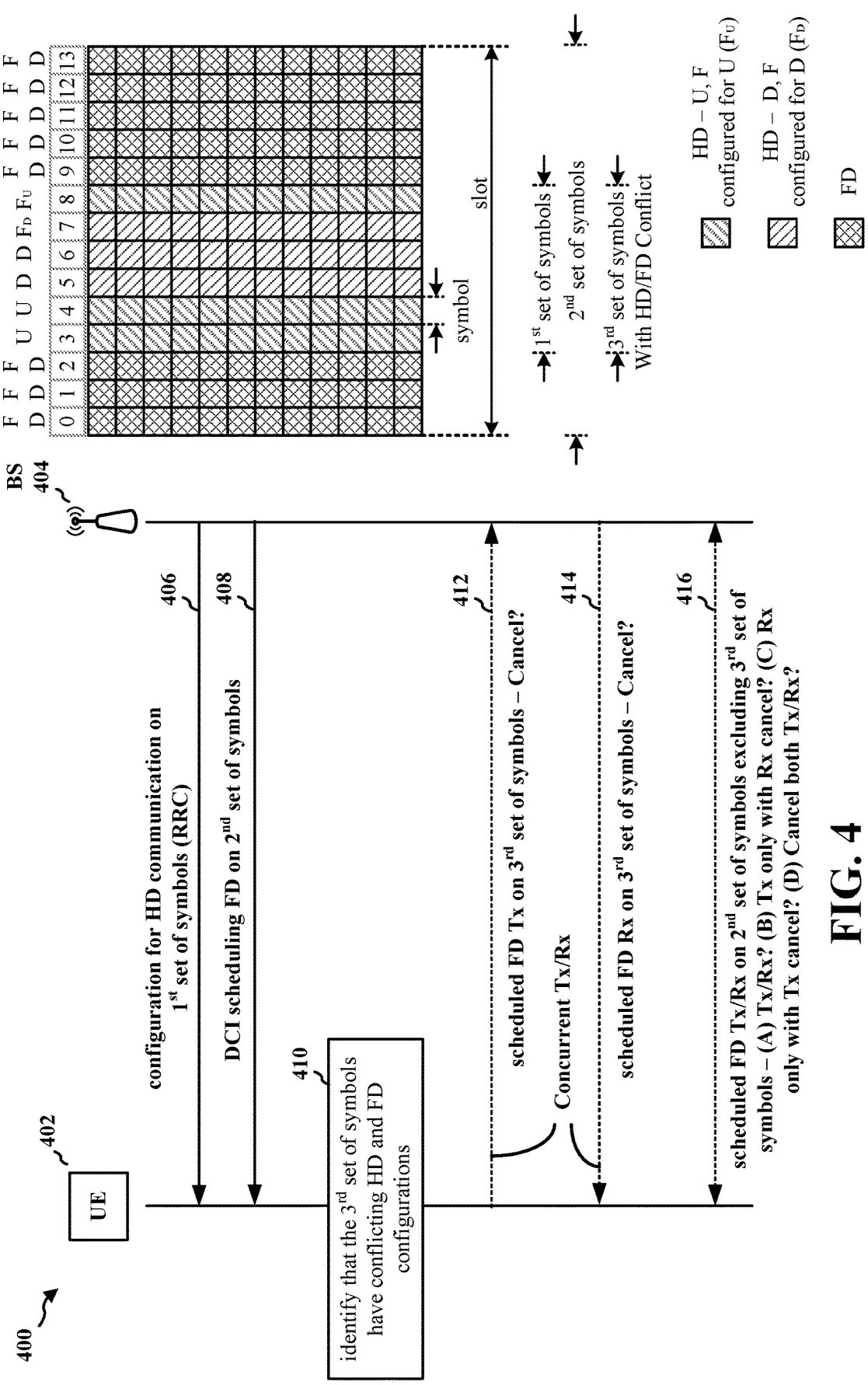
FIG. 4 is a call-flow diagram illustrating resolution of conflicts between half-duplex and full-duplex slot format configurations.

FIG. 4 is a call-flow diagram 400 illustrating resolution of conflicts between HD and FD slot format configurations. The UE 402 receives, from the BS 404, a configuration 406 through RRC signaling indicating that a first set of symbols (e.g., symbols 3-8 of the illustrated slot) is configured for HD communication with at least one of D symbols, U symbols, or F symbols in which the F symbols are configured as D or U. The UE 402 receives, from BS 404, DCI 408 scheduling FD communication including an FD transmission 412 and an FD reception 414 on a second set of symbols (e.g., symbols 0-13 of the illustrated slot). The second set of symbols have a third set of symbols (e.g., symbols 3-8 of the illustrated slot) in common with the first set of symbols. The third set of symbols are a subset of the second set of symbols. The UE 402 and/or the BS 404 identify 410 the third set of symbols have conflicting HD and FD configurations. In one aspect, the UE 402 and/or the BS 404 identify that the third set of symbols have the conflicting HD and FD configurations due to each symbol of the third set of symbols being configured for the HD communication based on the configuration communicated through RRC signaling and configured for the FD communication based on the received DCI. The UE 402 and/or the BS 404 cancel, based on the conflicting HD and FD configurations of the third set of symbols, at least one of the FD transmission 412 or the FD reception 414 in the third set of symbols. As to the scheduled FD communication in the second set of symbols excluding the third set of symbols, several options exist. As shown at 416, in different aspects, FD communication in the second set of symbols excluding the third set of symbols may be allowed in both directions, allowed in one of the directions, or canceled in both directions.

It should be appreciated that hereinafter the term "FD transmission" refers to transmission scheduled through the DCI 408 that scheduled the FD communication, and the term "FD reception" refers to reception scheduled through the DCI 408 that scheduled the FD communication. Further, it should be appreciated that herein canceling FD transmission 412 may mean one or more of the following: 1) not transmitting the scheduled FD transmission, 2) refraining from transmitting the scheduled FD transmission, 3) canceling the received UL grant that schedules the FD transmission, or 4) canceling the FD transmission. Moreover, canceling FD reception 414 may mean one or more of the following: 1) not expecting to receive the scheduled FD reception, 2) refraining from receiving the scheduled FD reception, 3) canceling the received DL grant that schedules the FD reception, 4) canceling the FD reception, or 5) not monitoring for the FD reception.

Figure 9:
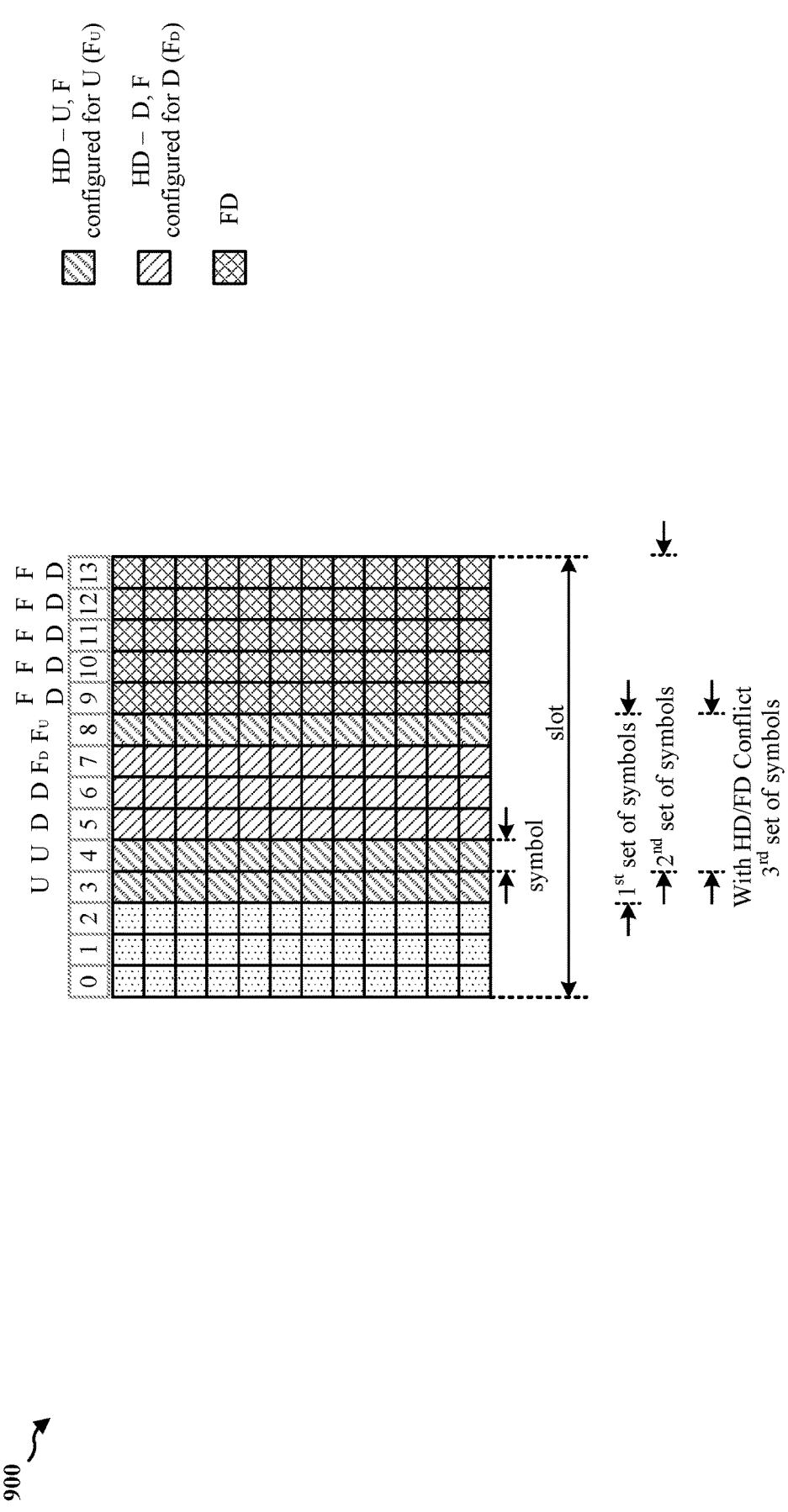
FIG. 9 is a diagram illustrating an example slot where the second set of symbols partially overlap with the first set of symbols.

It should be appreciated that FIG. 4 is illustrative and may be combined with other aspects or teachings described herein without limitation. Although the second set of symbols are a superset of the first set of symbols and spans the whole slot in FIG. 4, FIG. 4 represents one example and does not limit the disclosure. In other aspects, the second set of symbols may partially overlap with the first set of symbols. FIG. 9 is a diagram 900 illustrating an example slot where the second set of symbols (e.g., symbols 4-13) partially overlap with the first set of symbols (e.g., symbols 3-8).

Figure 10:
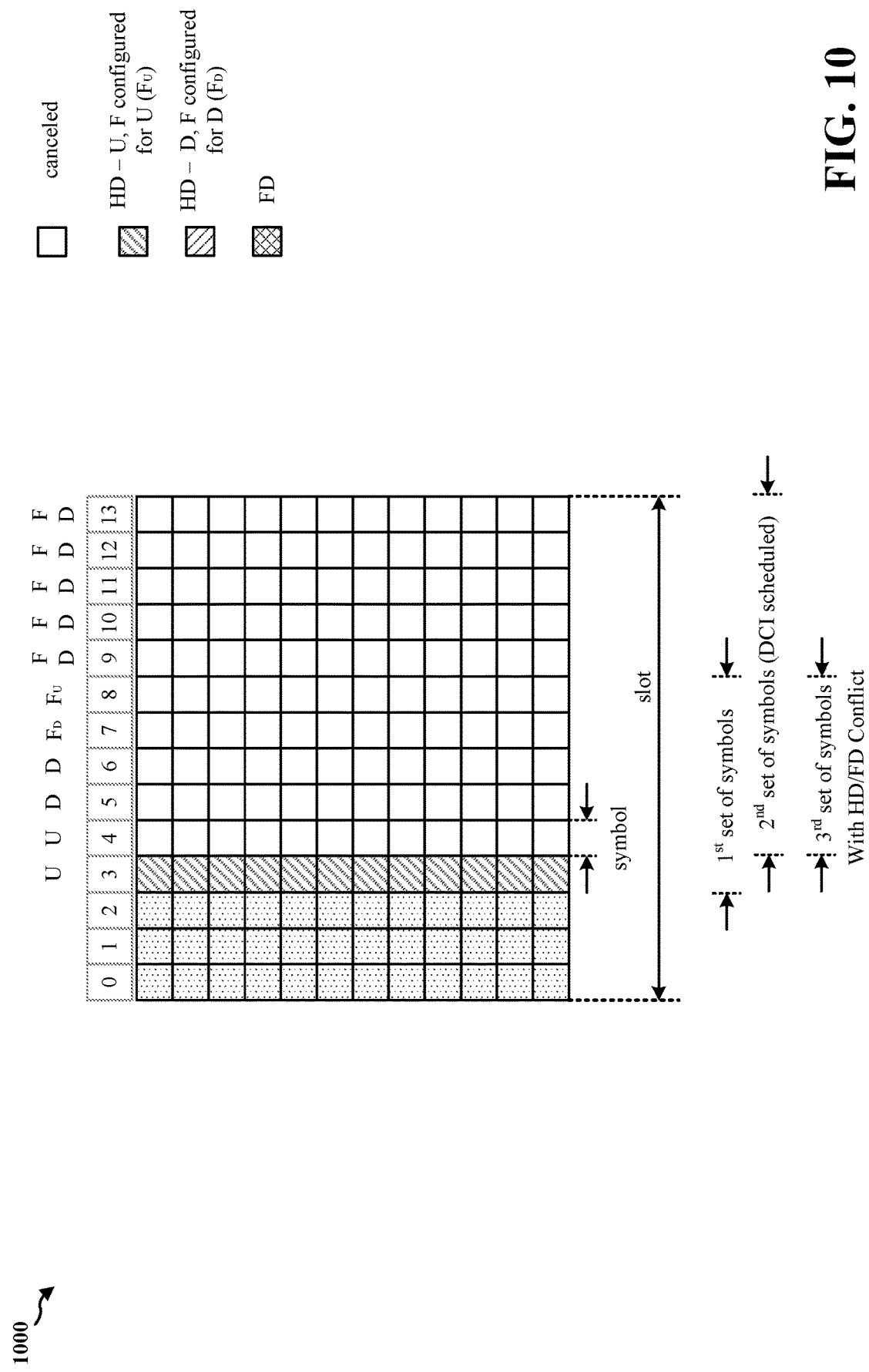
FIG. 10 is a diagram illustrating transmission of an example slot based on one example resolution of conflicts between HD and FD configurations.

FIGS. 5 and 10 are diagrams 500 and 1000, respectively, illustrating transmission of the example slot based on one example resolution of conflicts between HD and FD configurations. FIGS. 5 and 10 differ in that the second set of symbols in FIG. 5 correspond to the second set of symbols illustrated in FIG. 4, whereas the second set of symbols in FIG. 10 correspond to the second set of symbols illustrated in FIG. 9. As illustrated in FIGS. 5 and 10, the UE 402 may cancel both the FD transmission 412 and the FD reception 414 in the second set of symbols. From the perspective of the BS 404, the BS 404 may cancel both the reception by the BS 404 in association with the FD transmission 412 at the UE 402 and the transmission by the BS 404 in association with the FD reception 414 at the UE 402 in the second set of symbols.

Figure 6:
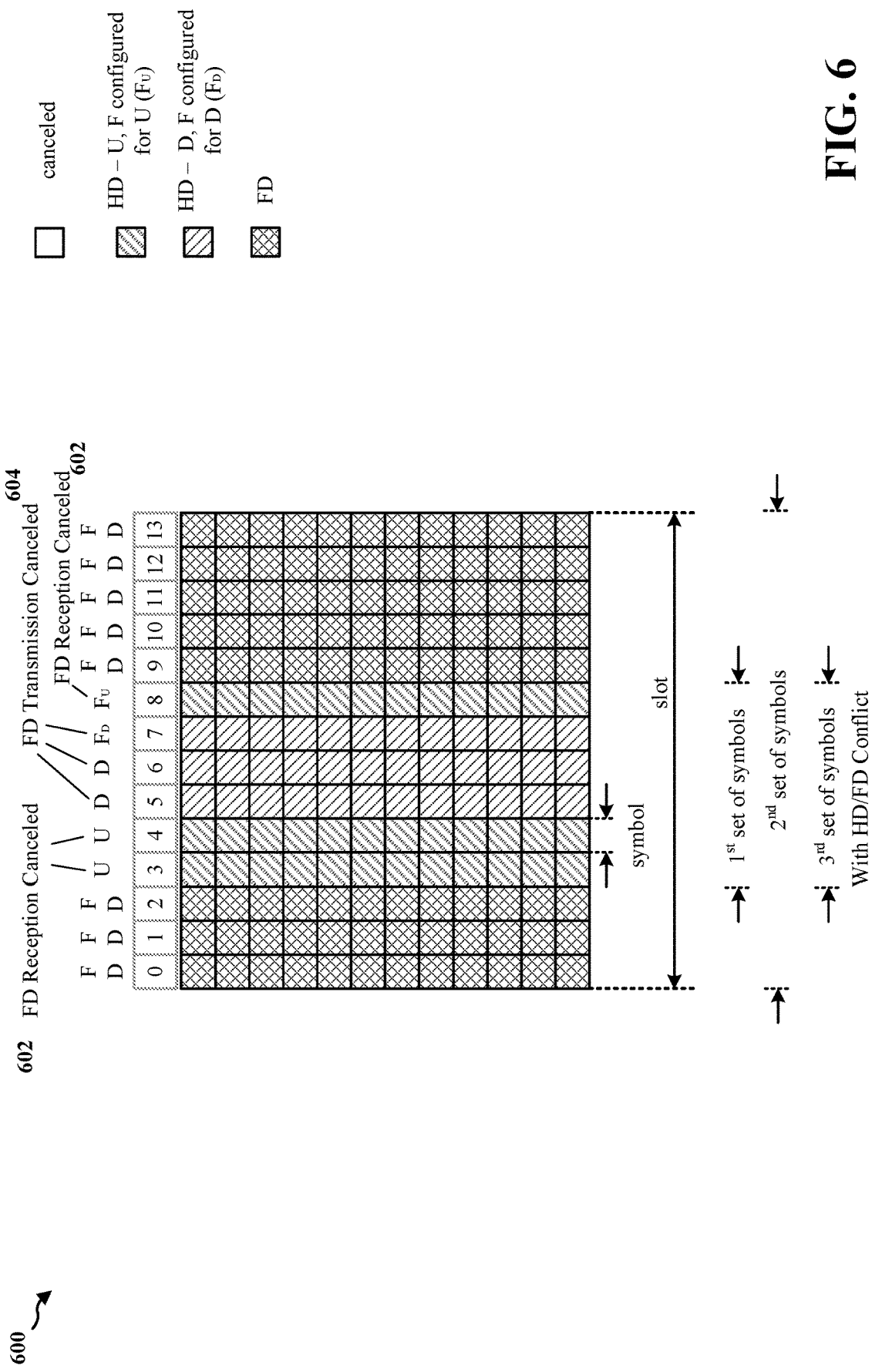
FIG. 6 is a diagram illustrating transmission of an example slot based on one example resolution of conflicts between HD and FD configurations.
Figure 11:
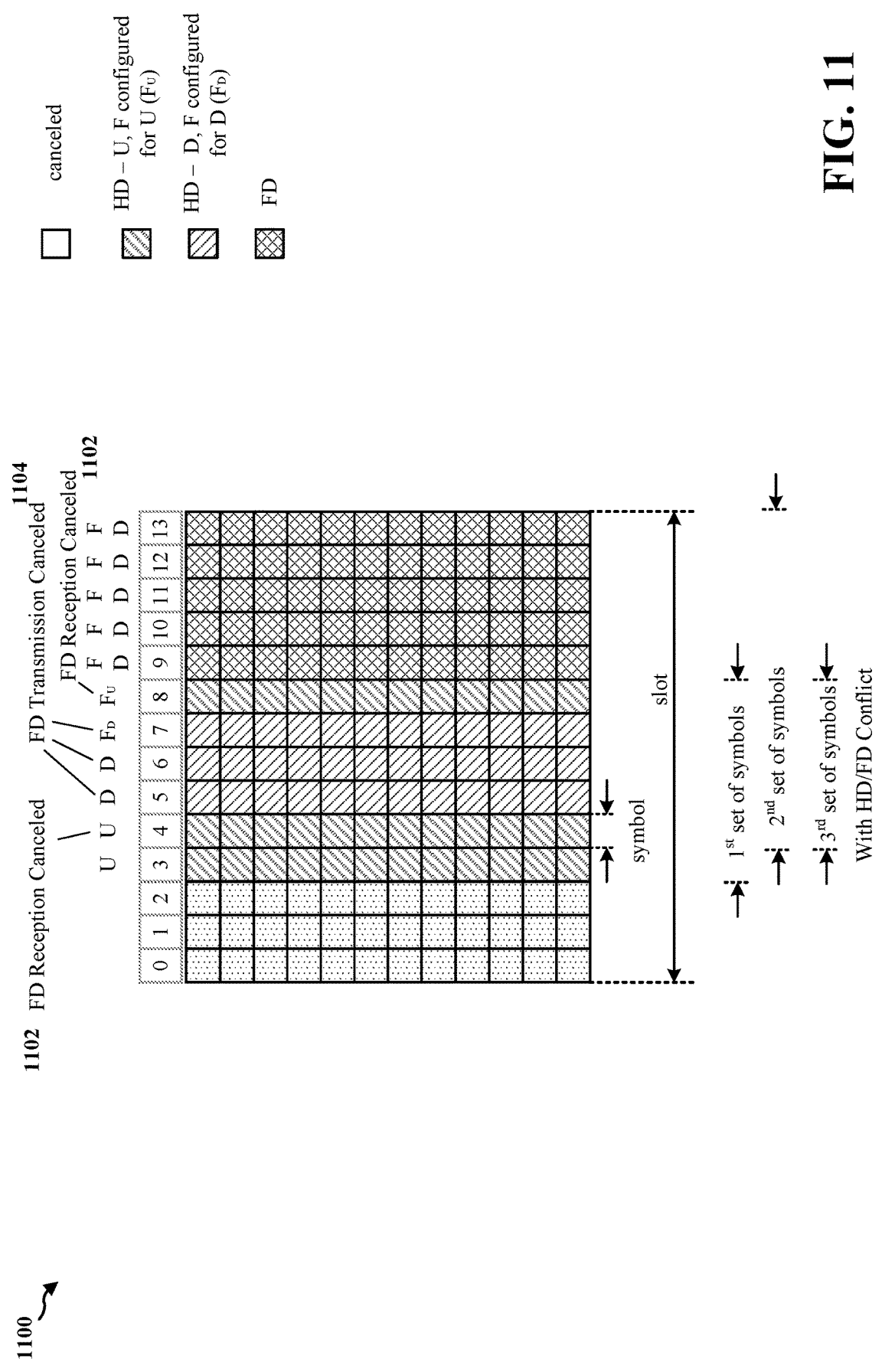

FIGS. 6 and 11 are diagrams 600 and 1100, respectively, illustrating transmission of the example slot based on another example resolution of conflicts between HD and FD configurations. FIGS. 6 and 11 differ in that the second set of symbols in FIG. 6 correspond to the second set of symbols illustrated in FIG. 4, whereas the second set of symbols in FIG. 11 correspond to the second set of symbols illustrated in FIG. 9. As illustrated in FIGS. 6 and 11, on each of the symbols involving conflicting HD and FD configurations, the transmission direction matching the direction as specified by the HD configuration 406 is allowed. In other words, the UE 402 may cancel 602, 1102 the FD reception 414 on U symbols and F symbols configured as U of the third set of symbols, and transmit on the U symbols and the F symbols configured as U of the third set of symbols based on the scheduled FD transmission 412 in the received DCI 408. Further, the UE 402 may cancel 604, 1104 the FD transmission 412 on D symbols and F symbols configured as D of the third set of symbols, and receive on the D symbols and the F symbols configured as D of the third set of symbols based on the scheduled FD reception 414 in the received DCI 408.

From the perspective of the BS 404, the BS 404 may cancel 602, 1102 the transmission by the BS 404 in association with the FD reception 414 at the UE 402 on U symbols and F symbols configured as U of the third set of symbols, and receive from the UE 402 on the U symbols and the F symbols configured as U of the third set of symbols based on the scheduled FD transmission 412 at the UE 402 in the transmitted DCI 408. Further, the BS 404 may cancel 604, 1104 the reception by the BS 404 in association with the FD transmission 412 at the UE 402 on D symbols and F symbols configured as D of the third set of symbols, and transmit to the UE 402 on the D symbols and the F symbols configured as D of the third set of symbols based on the scheduled FD reception 414 at the UE in the transmitted DCI 408.

In one aspect, the UE 402 may transmit and receive concurrently in the second set of symbols excluding the third set of symbols based on the scheduled FD transmission 412 and FD reception 414 in the received DCI 408, and the BS 404 may transmit and receive concurrently in the second set of symbols excluding the third set of symbols based on the scheduled FD reception 414 at the UE 402 and the FD transmission 412 at the UE 402, respectively, in the transmitted DCI 408.

In one aspect, if each symbol in the third set of symbols is associated with a same transmission direction as specified by the HD configuration 406, transmission in the second set of symbols in the same direction may be allowed, and transmission in the other direction may be canceled. On the other hand, if symbols in the third set of symbols are associated with mixed transmission directions as specified by the HD configuration 406, transmission in the second set of symbols may not be allowed in either direction.

Figure 7:
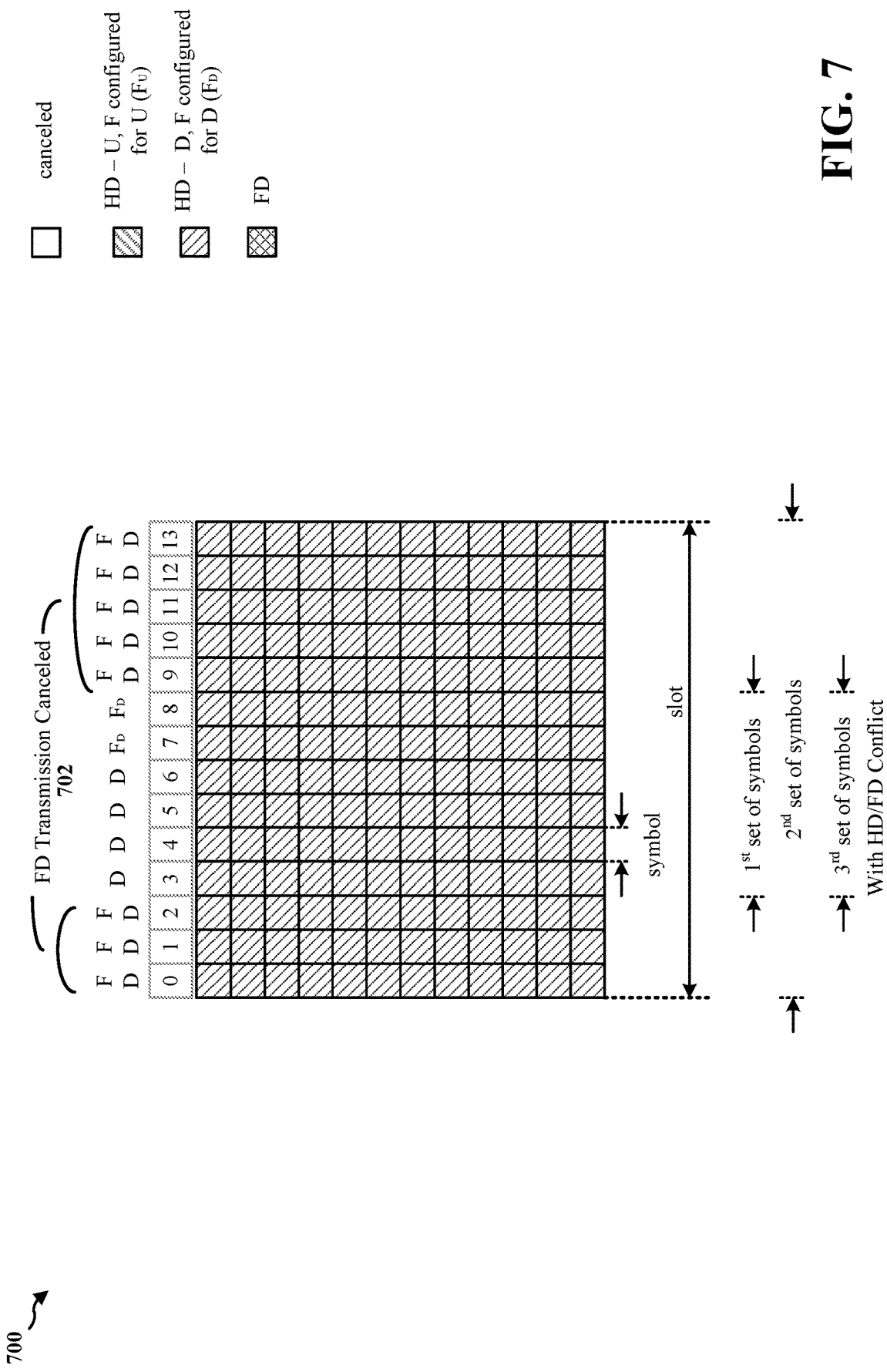
FIG. 7 is a diagram illustrating transmission of an example slot based on one example resolution of conflicts between HD and FD configurations.
Figure 12:
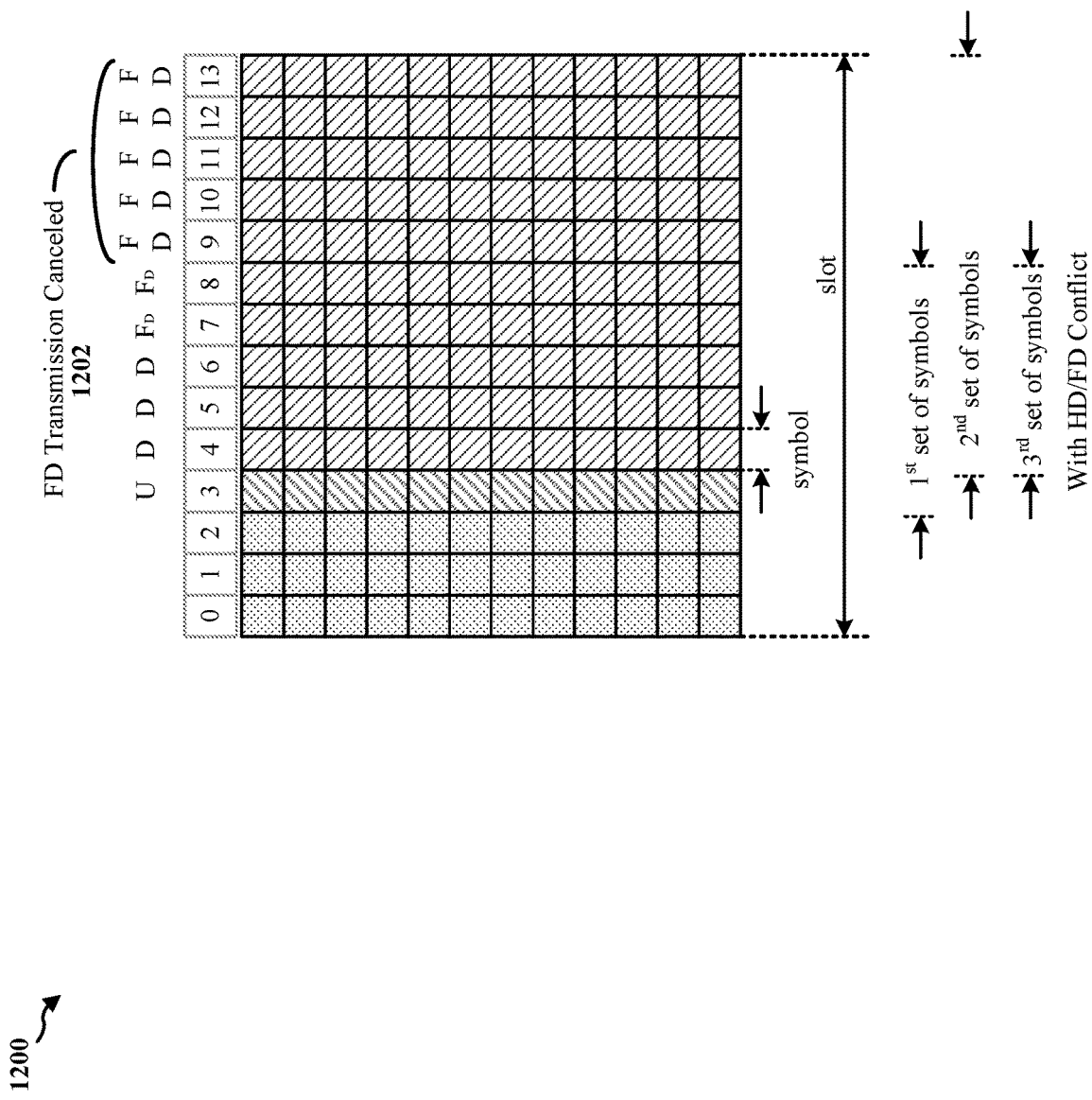
FIG. 12 is a diagram illustrating transmission of an example slot based on one example resolution of conflicts between HD and FD configurations.

FIGS. 7 and 12 are diagrams 700 and 1200, respectively, illustrating transmission of the example slot based on another example resolution of conflicts between HD and FD configurations. FIGS. 7 and 12 differ in that the second set of symbols in FIG. 7 correspond to the second set of symbols illustrated in FIG. 4, whereas the second set of symbols in FIG. 12 correspond to the second set of symbols illustrated in FIG. 9. As illustrated in FIGS. 7 and 12, each symbol in the third set of symbols is a D symbol or an F symbol configured as D, which may be identified by the UE 402 and the BS 404, either jointly or separately. Accordingly, the UE 402 may receive, based on the identification, in the second set of symbols based on the scheduled FD reception 414 in the received DCI 408. The UE 402 may further cancel 702, 1202, based on the identification, the FD transmission 412 in the second set of symbols based on the scheduled FD transmission 412 in the received DCI 408. From the perspective of the BS 404, the BS 404 may transmit, to the UE 402 based on the identification, in the second set of symbols based on the scheduled FD reception 414 at the UE 402 in the transmitted DCI 408. The BS 404 may further cancel 702, 1202, based on the identification, the reception by the BS 404 in association with the FD transmission 412 at the UE 402 in the second set of symbols based on the scheduled FD transmission 412 at the UE in the transmitted DCI 408.

Figure 8:
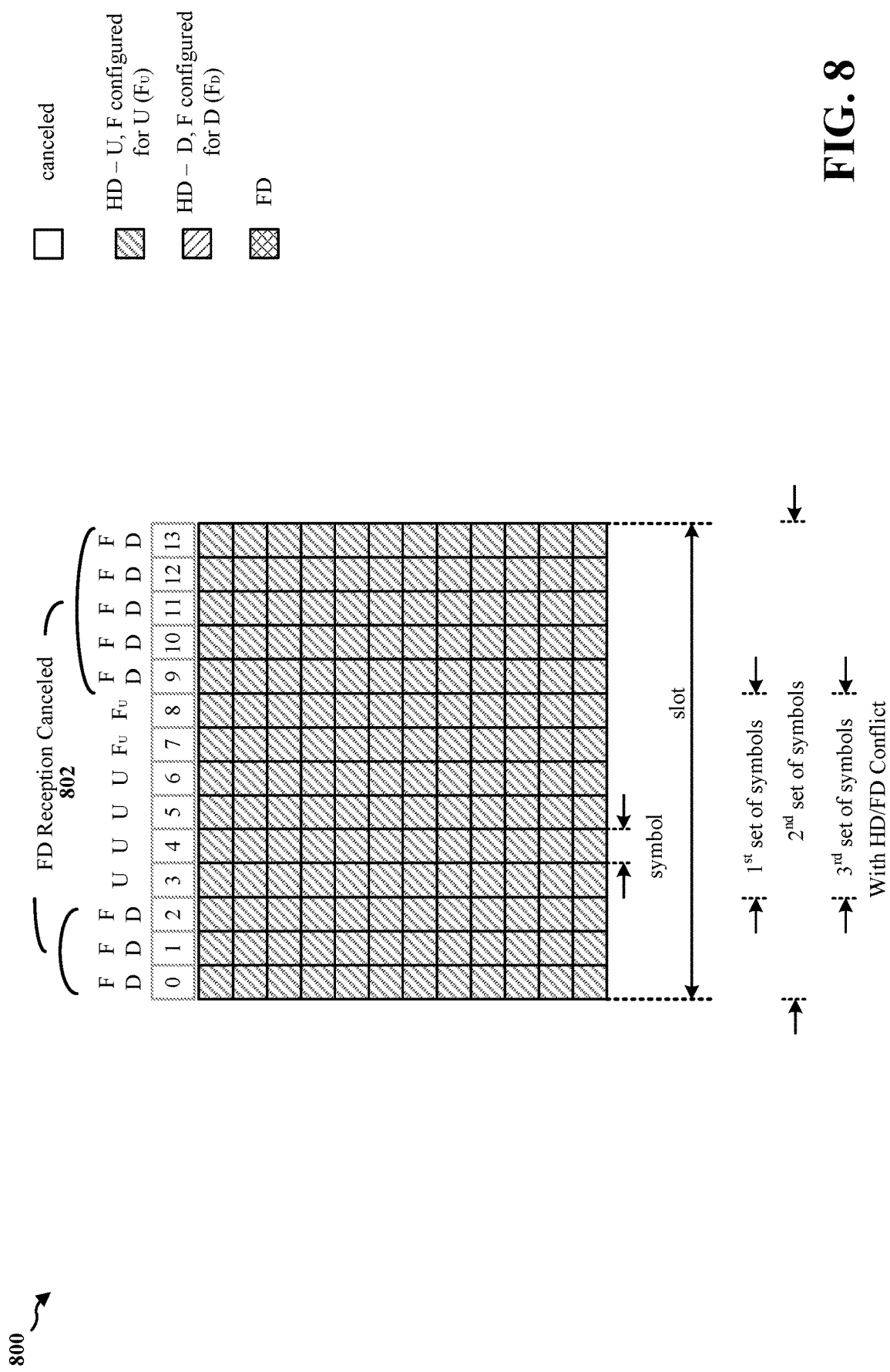
FIG. 8 is a diagram illustrating transmission of an example slot based on one example resolution of conflicts between HD and FD configurations.
Figure 13:
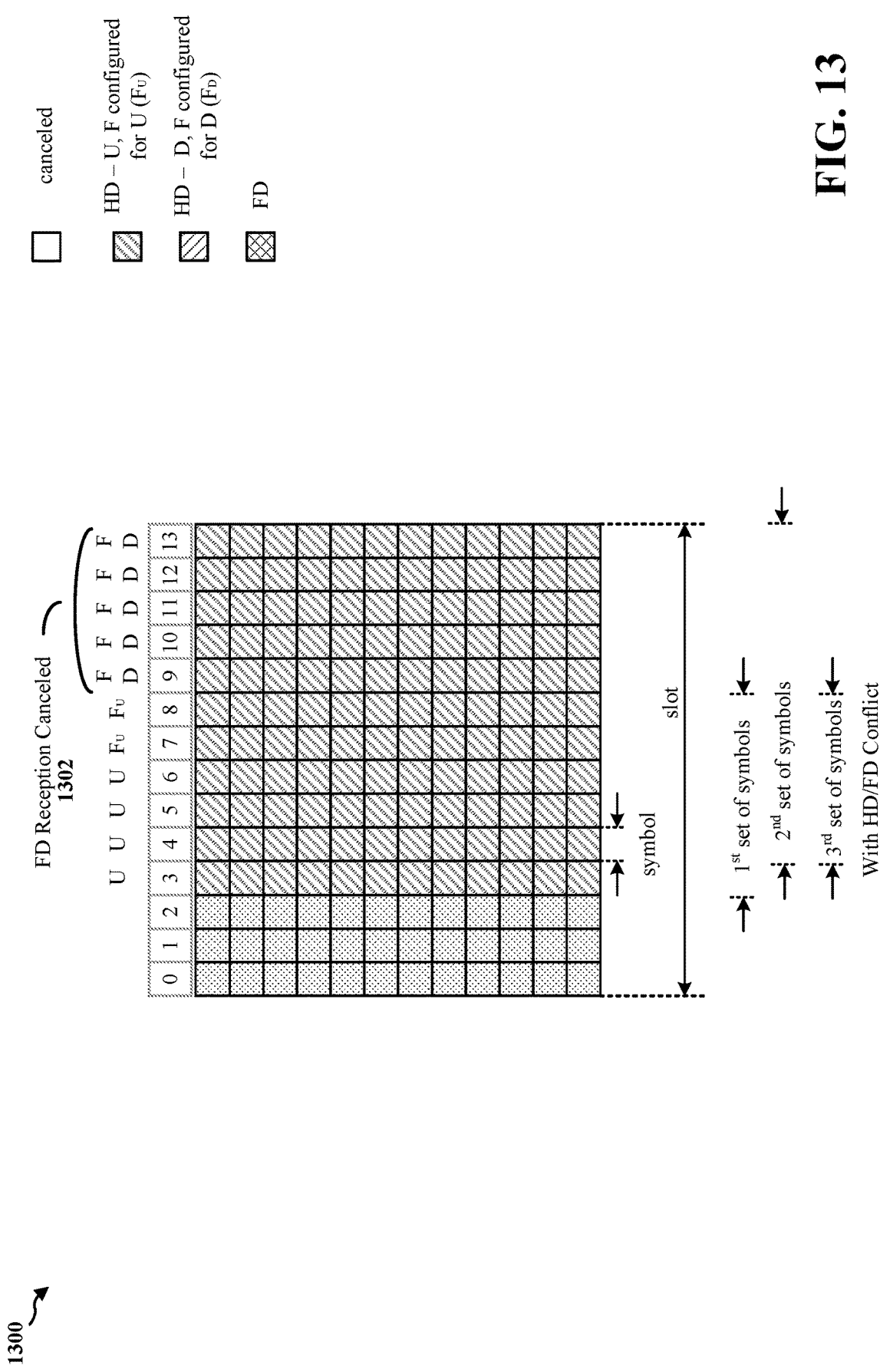
FIG. 13 is a diagram illustrating transmission of an example slot based on one example resolution of conflicts between HD and FD configurations.

FIGS. 8 and 13 are diagrams 800 and 1300, respectively, illustrating transmission of the example slot based on another example resolution of conflicts between HD and FD configurations. FIGS. 8 and 13 differ in that the second set of symbols in FIG. 8 correspond to the second set of symbols illustrated in FIG. 4, whereas the second set of symbols in FIG. 13 correspond to the second set of symbols illustrated in FIG. 9. As illustrated in FIGS. 8 and 13, each symbol in the third set of symbols is a U symbol or an F symbol configured as U, which may be identified by the UE 402 and the BS 404, either jointly or separately. The UE 402 may transmit, based on the identification, in the second set of symbols based on the scheduled FD transmission 412 in the received DCI 408. The UE 402 may further cancel 802, 1302, based on the identification, the FD reception 414 in the second set of symbols based on the scheduled FD reception 414 in the received DCI 408. From the perspective of the BS 404, the BS 404 may receive, from the UE 402 based on the identification, in the second set of symbols based on the scheduled FD transmission 412 at the UE in the transmitted DCI 408. The BS 404 may further cancel 802, 1302, based on the identification, the transmission by the BS 404 in association with the FD reception 414 at the UE 402 in the second set of symbols based on the scheduled FD reception 414 at the UE 402 in the transmitted DCI 408.

In another aspect, the UE 402 and the BS 404 may identify, either jointly or separately, that at least one symbol in the third set of symbols is a D symbol (or an F symbol configured as D) and that at least one symbol in the third set of symbols is a U symbol (or an F symbol configured as U). The UE 402 may cancel, based on the identification, the FD transmission 412 and the FD reception 414 in the second set of symbols based on the scheduled FD transmission 412 and FD reception 414 in the received DCI 408. From the perspective of the BS 404, the BS 404 may cancel, based on the identification, the reception by the BS 404 in association with the FD transmission 412 at the UE 402 and the transmission by the BS 404 in association with the FD reception 414 at the UE 402 in the second set of symbols based on the scheduled FD transmission 412 at the UE 402 and FD reception 414 at the UE 402 in the transmitted DCI 408. It should be appreciated that FIGS. 5 and 10 illustrate this scenario as well.

It should be appreciated that although FIGS. 4-13 have been illustrated in relation to an FDD FD system, aspects described herein may be utilized with TDD FD systems as well.

In some aspects of wireless communications, the technique of slot aggregation is described, where the same payload in the downlink/uplink transmission is repeated in consecutive slots or mini-slots. The receiver may soft-combine the received aggregated slots to boost processing signal-to-noise ratio (SNR). The technique may be used for a PUSCH/PDSCH. In some aspects of wireless communications, different spatial beams may be used for the aggregated slots with millimeter wave communications. This enables better diversity against blockages in the millimeter wave bands. In FD systems, slot aggregation may be utilized for FD transmissions (e.g., different slots are transmitted on different beam pairs) for increased diversity.

In slot aggregation cases, the conflicting slots may be canceled. For example, if DCI schedules an uplink slot with an aggregation factor, e.g., aggregation factor 4, then a last slot may have a conflict, and may be canceled.

If a UE is scheduled by a DCI format 1_1 to receive a PDSCH over multiple slots, and if tdd-UL-DL-ConfigurationCommon or tdd-UL-DL-ConfigurationDedicated indicates that, for a slot from the multiple slots, at least one symbol from a set of symbols where the UE is scheduled for PDSCH reception in the slot is an uplink symbol, the UE may not receive the PDSCH in the slot.

If a UE is scheduled by a DCI format 0_1 to transmit a PUSCH over multiple slots, and if tdd-UL-DL-ConfigurationCommon or tdd-UL-DL-ConfigurationDedicated indicates that, for a slot from the multiple slots, at least one symbol from a set of symbols where the UE is scheduled for PUSCH transmission in the slot is a downlink symbol, the UE may not transmit the PUSCH in the slot.

Figure 14:
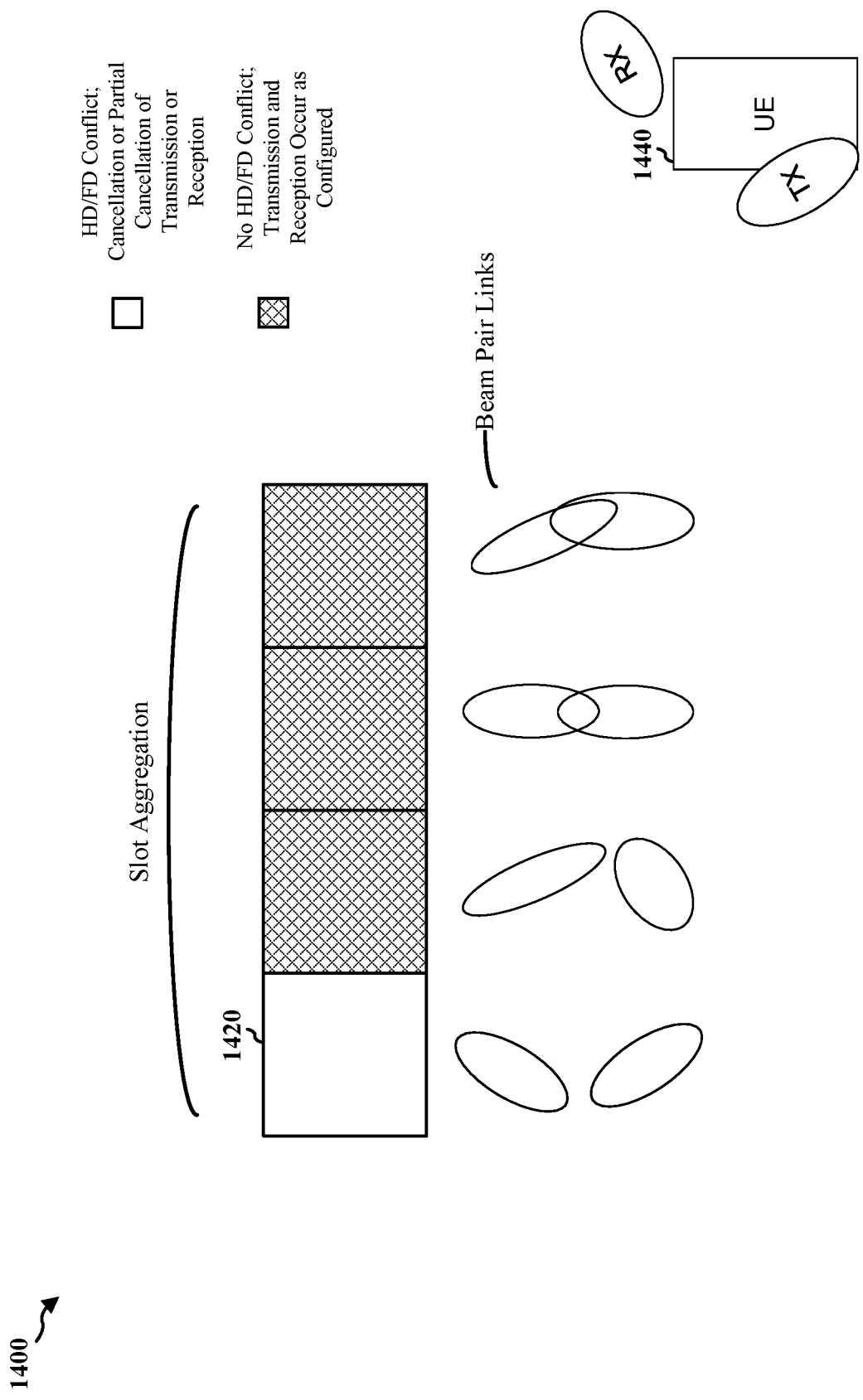
FIG. 14 is a diagram illustrating example aggregated slots in connection with resolution of conflicts between HD and FD configurations.

FIG. 14 is a diagram 1400 illustrating example aggregated slots in connection with resolution of conflicts between HD and FD configurations. As shown in FIG. 14, different beam pair links may be utilized for slot aggregation. The aggregated slots may carry the same payload, but are transmitted over different spatial beam pair links. In one aspect, where slot aggregation is utilized, the resolution of conflicts between HD and FD configurations may be performed on a slot-by-slot basis. In other words, a conflict within one slot may not affect the other aggregated slots. For example, the DCI 408 may schedule the FD transmission 412 and the FD reception 414 with a same control information or data in each of a plurality of slots associated with slot aggregation. The second set of symbols is within a first slot 1420 of the plurality of slots. The canceling of the at least one of the FD transmission 412 or the FD reception 414 in the third set of symbols is within the first slot 1420 and is independent of remaining slots of the plurality of slots. From the perspective of the BS 404, the DCI may schedule the FD transmission 412 at the UE 402 and the FD reception 414 at the UE 402 with a same control information or data in each of a plurality of slots associated with slot aggregation. The second set of symbols is within a first slot 1420 of the plurality of slots. The canceling of the at least one of the reception by the BS 404 in association with the FD transmission 412 at the UE 402 or transmission by the BS 404 in association with the FD reception 414 at the UE 402 in the third set of symbols is within the first slot 1420 and is independent of remaining slots of the plurality of slots. FIG. 14 also illustrates a UE 1440 in the FD mode where spatial division multiplexing (SDM) is utilized and the uplink (Tx) and downlink (Rx) connections are carried on different beams. The frequency resources utilized by the uplink and downlink connections may be the same, or may be different.

Figure 15:
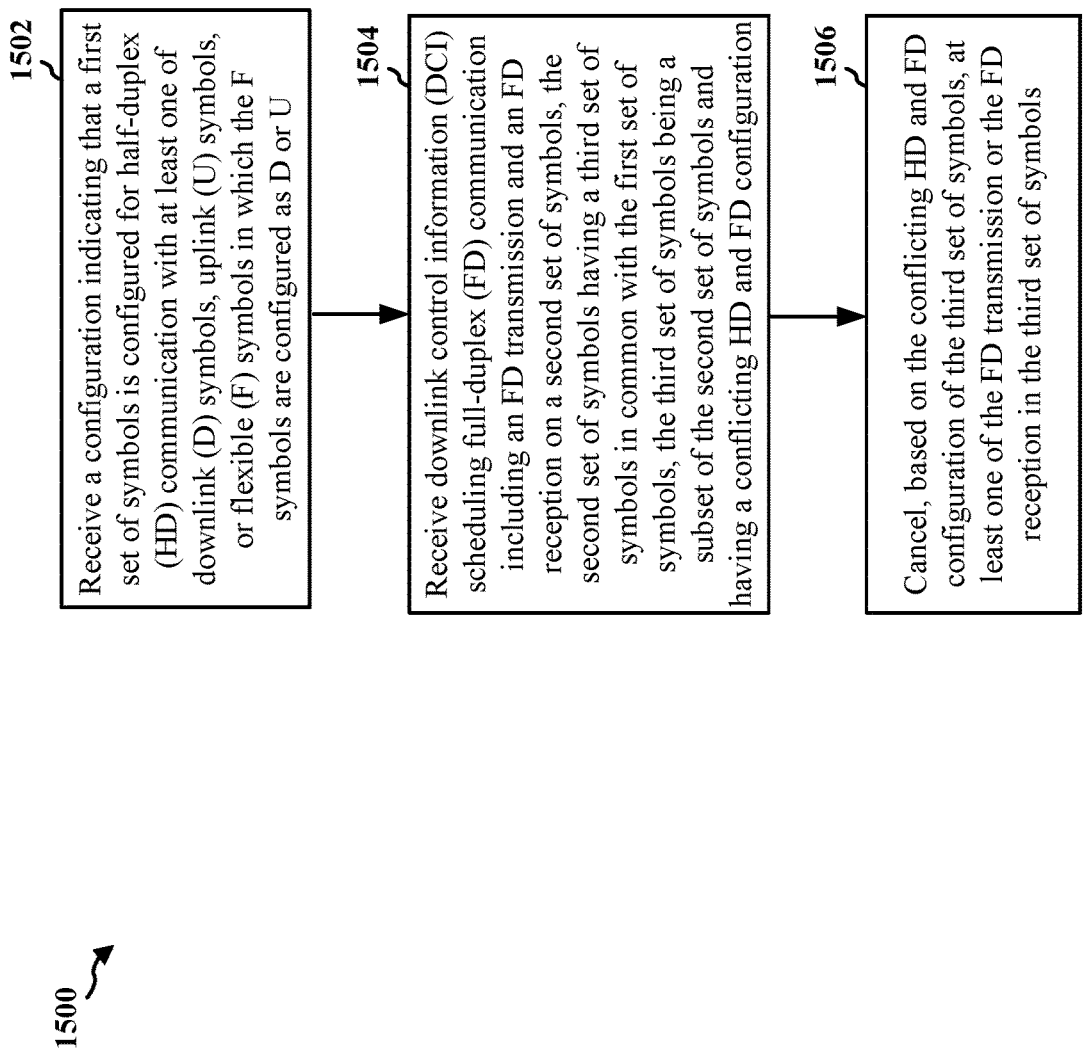
FIG. 15 is a flowchart of a method of wireless communication.

FIG. 15 is a flowchart 1500 of a method of wireless communication. The method may be performed by a UE (e.g., the UE 104/350/402; the apparatus 1702). At 1502, the UE receives a configuration indicating that a first set of symbols is configured for HD communication with at least one of D symbols, U symbols, or F symbols in which the F symbols are configured as D or U. For example, 1502 may be performed by the reception component 1730 in FIG. 17. Referring back to FIG. 4, at 406, the UE 402 may receive a configuration indicating that a first set of symbols is configured for HD communication with at least one of D symbols, U symbols, or F symbols in which the F symbols are configured as D or U.

At 1504, the UE receives DCI scheduling FD communication including an FD transmission and an FD reception on a second set of symbols. The second set of symbols have a third set of symbols in common with the first set of symbols. The third set of symbols are a subset of the second set of symbols and have conflicting HD and FD configurations. For example, 1504 may be performed by the reception component 1730 in FIG. 17. Referring back to FIG. 4, at 408, the UE 402 may receive DCI scheduling FD communication including an FD transmission and an FD reception on a second set of symbols.

At 1506, the UE cancels, based on the conflicting HD and FD configurations of the third set of symbols, at least one of the FD transmission or the FD reception in the third set of symbols. For example, 1506 may be performed by the slot format conflict resolution component 1740 in FIG. 17. Referring back to FIG. 4, at 412 or 414, the UE 402 may cancel, based on the conflicting HD and FD configurations of the third set of symbols, at least one of the FD transmission or the FD reception in the third set of symbols.

In one configuration, the canceling the at least one of the FD transmission or the FD reception in the third set of symbols may include canceling both the FD transmission and the FD reception in the second set of symbols.

In one configuration, the canceling the at least one of the FD transmission or the FD reception in the third set of symbols may include canceling the FD reception on U symbols and F symbols configured as U of the third set of symbols. The UE may transmit on the U symbols and the F symbols configured as U of the third set of symbols based on the scheduled FD transmission in the received DCI.

In one configuration, the UE may transmit and receive concurrently in the second set of symbols excluding the third set of symbols based on the scheduled FD transmission and FD reception in the received DCI.

In one configuration, the canceling the at least one of the FD transmission or the FD reception in the third set of symbols may include canceling the FD transmission on D symbols and F symbols configured as D of the third set of symbols. The UE may receive on the D symbols and the F symbols configured as D of the third set of symbols based on the scheduled FD reception in the received DCI.

In one configuration, the UE may transmit and receive concurrently in the second set of symbols excluding the third set of symbols based on the scheduled FD transmission and FD reception in the received DCI.

In one configuration, the UE may identify that each symbol in the third set of symbols is a D symbol or an F symbol configured as D. The UE may receive, based on the identification, in the second set of symbols based on the scheduled FD reception in the received DCI. The UE may cancel, based on the identification, the FD transmission in the second set of symbols based on the scheduled FD transmission in the received DCI.

In one configuration, the UE may identify that each symbol in the third set of symbols is a U symbol or an F symbol configured as U. The UE may transmit, based on the identification, in the second set of symbols based on the scheduled FD transmission in the received DCI. The UE may cancel, based on the identification, the FD reception in the second set of symbols based on the scheduled FD reception in the received DCI.

In one configuration, the UE may identify that at least one symbol in the third set of symbols is a D symbol and that at least one symbol in the third set of symbols is a U symbol. The UE may cancel, based on the identification, the FD transmission and the FD reception in the second set of symbols based on the scheduled FD transmission and FD reception in the received DCI.

In one configuration, the DCI may schedule the FD transmission and the FD reception with a same control information or data in each of a plurality of slots associated with slot aggregation. The second set of symbols may be within a first slot of the plurality of slots. The canceling of the at least one of the FD transmission or the FD reception in the third set of symbols may be within the first slot, and may be independent of remaining slots of the plurality of slots.

In one configuration, the received configuration indicating that the first set of symbols is configured for HD communication may be received through RRC signaling.

In one configuration, the UE may identify that the third set of symbols have the conflicting HD and FD configurations due to each symbol of the third set of symbols being configured for the HD communication based on the received configuration and configured for the FD communication based on the received DCI.

Figure 16:
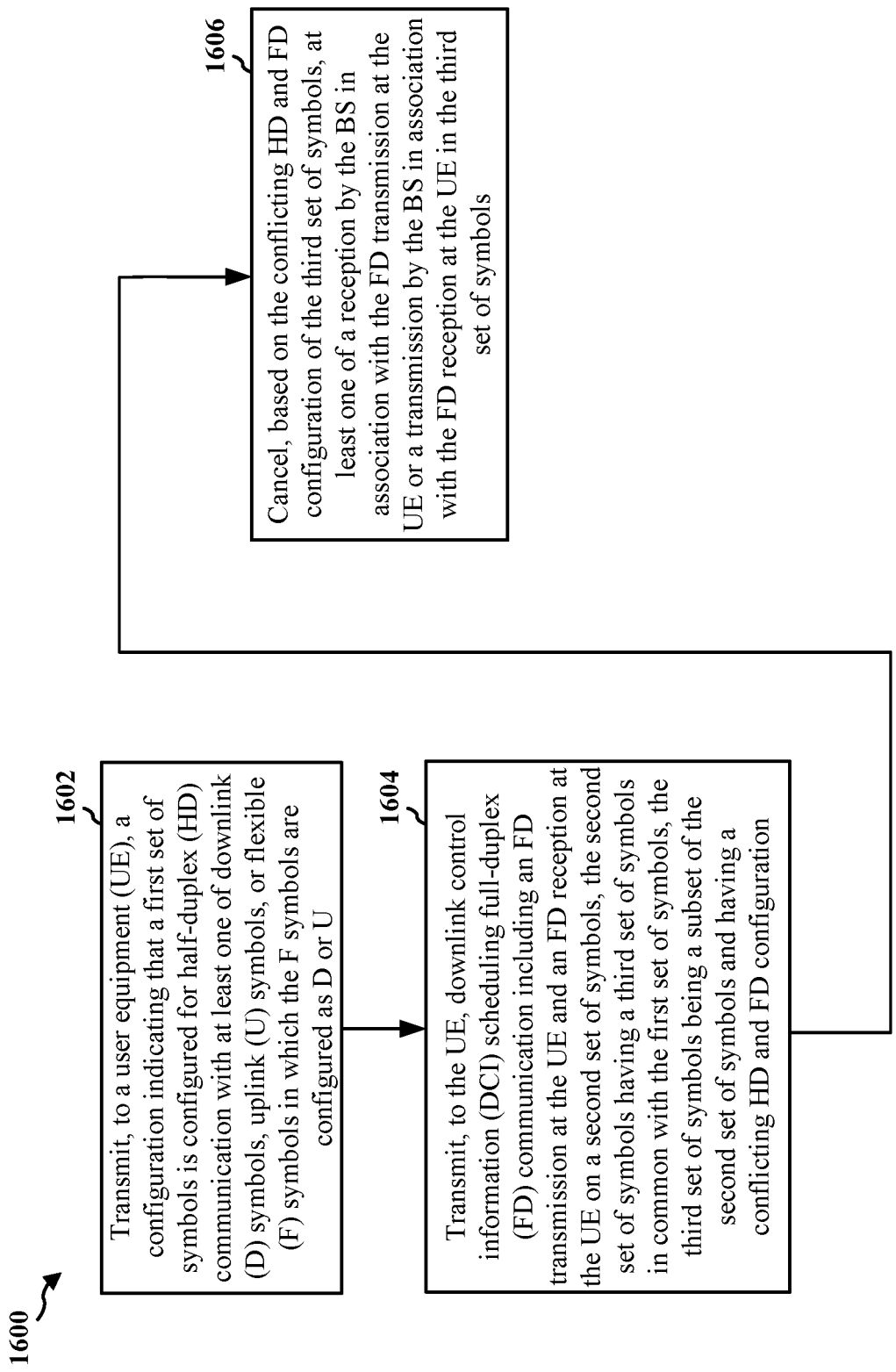
FIG. 16 is a flowchart of a method of wireless communication.

FIG. 16 is a flowchart 1600 of a method of wireless communication. The method may be performed by a base station (e.g., the base station 102/180/310/404; the apparatus 1802). At 1602, the base station transmits, to a UE, a configuration indicating that a first set of symbols is configured for HD communication with at least one of D symbols, U symbols, or F symbols in which the F symbols are configured as D or U. For example, 1602 may be performed by the transmission component 1834 in FIG. 18. Referring back to FIG. 4, at 406, the base station 404 may transmit, to a UE 402, a configuration indicating that a first set of symbols is configured for HD communication with at least one of D symbols, U symbols, or F symbols in which the F symbols are configured as D or U.

At 1604, the base station transmits, to the UE, DCI scheduling FD communication including an FD transmission at the UE and an FD reception at the UE on a second set of symbols. The second set of symbols have a third set of symbols in common with the first set of symbols. The third set of symbols are a subset of the second set of symbols and have conflicting HD and FD configurations. For example, 1604 may be performed by the transmission component 1834 in FIG. 18. Referring back to FIG. 4, at 408, the base station 404 may transmit, to the UE 402, DCI scheduling FD communication including an FD transmission at the UE 402 and an FD reception at the UE 402 on a second set of symbols.

At 1606, the base station cancels, based on the conflicting HD and FD configurations of the third set of symbols, at least one of a reception by the BS in association with the FD transmission at the UE or a transmission by the BS in association with the FD reception at the UE in the third set of symbols. For example, 1606 may be performed by the slot format conflict resolution component 1840 in FIG. 18. Referring back to FIG. 4, at 412 or 414, the base station 404 may cancel, based on the conflicting HD and FD configurations of the third set of symbols, at least one of a reception by the BS 404 in association with the FD transmission at the UE 402 or a transmission by the BS 404 in association with the FD reception at the UE 402 in the third set of symbols.

In one configuration, the canceling the at least one of the reception by the BS in association with the FD transmission at the UE or the transmission by the BS in association with the FD reception at the UE in the third set of symbols may include canceling both the reception by the BS in association with the FD transmission at the UE and the transmission by the BS in association with the FD reception at the UE in the second set of symbols.

In one configuration, the canceling the at least one of the reception by the BS in association with the FD transmission at the UE or the transmission by the BS in association with the FD reception at the UE in the third set of symbols may include canceling the transmission by the BS in association with the FD reception at the UE on U symbols and F symbols configured as U of the third set of symbols. The base station may receive, from the UE, on the U symbols and the F symbols configured as U of the third set of symbols based on the scheduled FD transmission at the UE in the transmitted DCI.

In one configuration, the base station may transmit and receive concurrently in the second set of symbols excluding the third set of symbols based on the scheduled FD reception at the UE and the FD transmission at the UE, respectively, in the transmitted DCI.

In one configuration, the canceling the at least one of the reception by the BS in association with the FD transmission at the UE or the transmission by the BS in association with the FD reception at the UE in the third set of symbols may include canceling the reception by the BS in association with the FD transmission at the UE on D symbols and F symbols configured as D of the third set of symbols. The base station may transmit, to the UE, on the D symbols and the F symbols configured as D of the third set of symbols based on the scheduled FD reception at the UE in the transmitted DCI.

In one configuration, the base station may transmit and receive concurrently in the second set of symbols excluding the third set of symbols based on the scheduled FD reception at the UE and the FD transmission at the UE, respectively, in the transmitted DCI.

In one configuration, the base station may identify that each symbol in the third set of symbols is a D symbol or an F symbol configured as D. The base station may transmit, to the UE based on the identification, in the second set of symbols based on the scheduled FD reception at the UE in the transmitted DCI. The base station may cancel, based on the identification, the reception by the BS in association with the FD transmission at the UE in the second set of symbols based on the scheduled FD transmission at the UE in the transmitted DCI.

In one configuration, the base station may identify that each symbol in the third set of symbols is a U symbol or an F symbol configured as U. The base station may receive, from the UE based on the identification, in the second set of symbols based on the scheduled FD transmission at the UE in the transmitted DCI. The base station may cancel, based on the identification, the transmission by the BS in association with the FD reception at the UE in the second set of symbols based on the scheduled FD reception at the UE in the transmitted DCI.

In one configuration, the base station may identify that at least one symbol in the third set of symbols is a D symbol and that at least one symbol in the third set of symbols is a U symbol. The base station may cancel, based on the identification, the reception by the BS in association with the FD transmission at the UE and the transmission by the BS in association with the FD reception at the UE in the second set of symbols based on the scheduled FD transmission at the UE and FD reception at the UE in the transmitted DCI.

In one configuration, the DCI may schedule the FD transmission at the UE and the FD reception at the UE with a same control information or data in each of a plurality of slots associated with slot aggregation. The second set of symbols may be within a first slot of the plurality of slots. The canceling of the at least one of the reception by the BS in association with the FD transmission at the UE or transmission by the BS in association with the FD reception at the UE in the third set of symbols may be within the first slot, and may be independent of remaining slots of the plurality of slots.

In one configuration, the transmitted configuration indicating that the first set of symbols is configured for HD communication may be transmitted through RRC signaling.

In one configuration, the base station may identify that the third set of symbols have the conflicting HD and FD configurations due to each symbol of the third set of symbols being configured for the HD communication based on the transmitted configuration and configured for the FD communication based on the transmitted DCI.

Figure 17:
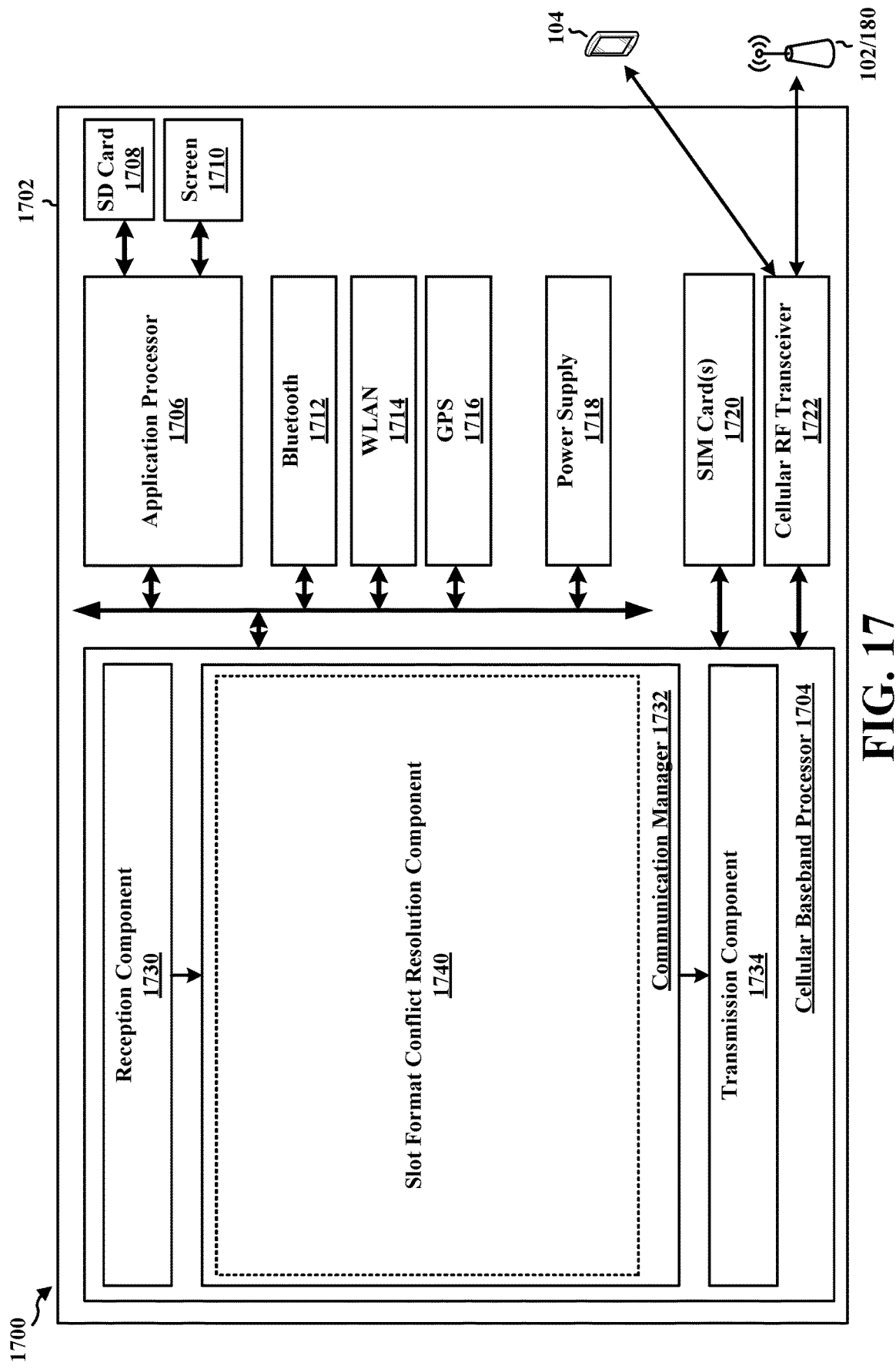
FIG. 17 is a diagram illustrating an example of a hardware implementation for an example apparatus.

FIG. 17 is a diagram 1700 illustrating an example of a hardware implementation for an apparatus 1702. The apparatus 1702 may be a UE, a component of a UE, or may implement UE functionality. In some aspects, the apparatus 1702 may include a cellular baseband processor 1704 (also referred to as a modem) coupled to a cellular RF transceiver 1722. In some aspects, the apparatus 1702 may further include one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, or a power supply 1718. The cellular baseband processor 1704 communicates through the cellular RF transceiver 1722 with the UE 104 and/or BS 102/180. The cellular baseband processor 1704 may include a computer-readable medium/memory. The computer-readable medium/memory may be non-transitory. The cellular baseband processor 1704 is responsible for general processing, including the execution of software stored on the computer-readable medium/memory. The software, when executed by the cellular baseband processor 1704, causes the cellular baseband processor 1704 to perform the various functions described supra. The computer-readable medium/memory may also be used for storing data that is manipulated by the cellular baseband processor 1704 when executing software. The cellular baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the cellular baseband processor 1704. The cellular baseband processor 1704 may be a component of the UE 350 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire UE (e.g., see 350 of FIG. 3) and include the additional modules of the apparatus 1702.

The reception component 1730 is configured to receive a configuration indicating that a first set of symbols is configured for HD communication with at least one of D symbols, U symbols, or F symbols in which the F symbols are configured as D or U, e.g., as described in connection with 1502. The reception component 1730 is configured to receive DCI scheduling FD communication including an FD transmission and an FD reception on a second set of symbols, e.g., as described in connection with 1504. The second set of symbols have a third set of symbols in common with the first set of symbols. The third set of symbols are a subset of the second set of symbols and have conflicting HD and FD configurations. The communication manager 1732 includes a slot format conflict resolution component 1740 that cancels, based on the conflicting HD and FD configurations of the third set of symbols, at least one of the FD transmission or the FD reception in the third set of symbols, e.g., as described in connection with 1506.

The apparatus may include additional components that perform each of the blocks of the algorithm in the flowcharts of FIGS. 4 and 15. As such, each block in the flowcharts of FIGS. 4 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the cellular baseband processor 1704, includes means for receiving a configuration indicating that a first set of symbols is configured for HD communication with at least one of D symbols, U symbols, or F symbols in which the F symbols are configured as D or U. The apparatus 1702, and in particular the cellular baseband processor 1704, includes means for receiving DCI scheduling FD communication including an FD transmission and an FD reception on a second set of symbols, the second set of symbols having a third set of symbols in common with the first set of symbols, the third set of symbols being a subset of the second set of symbols and having conflicting HD and FD configurations. The apparatus 1702, and in particular the cellular baseband processor 1704, includes means for canceling, based on the conflicting HD and FD configurations of the third set of symbols, at least one of the FD transmission or the FD reception in the third set of symbols.

In one configuration, the means for canceling the at least one of the FD transmission or the FD reception in the third set of symbols may be further configured to cancel both the FD transmission and the FD reception in the second set of symbols. In one configuration, the means for canceling the at least one of the FD transmission or the FD reception in the third set of symbols may be further configured to cancel the FD reception on U symbols and F symbols configured as U of the third set of symbols. The apparatus 1702, and in particular the cellular baseband processor 1704, includes means for transmitting on the U symbols and the F symbols configured as U of the third set of symbols based on the scheduled FD transmission in the received DCI. In one configuration, the apparatus 1702, and in particular the cellular baseband processor 1704, includes means for transmitting and receiving concurrently in the second set of symbols excluding the third set of symbols based on the scheduled FD transmission and FD reception in the received DCI. In one configuration, the means for canceling the at least one of the FD transmission or the FD reception in the third set of symbols may be further configured to cancel the FD transmission on D symbols and F symbols configured as D of the third set of symbols. The apparatus 1702, and in particular the cellular baseband processor 1704, includes means for receiving on the D symbols and the F symbols configured as D of the third set of symbols based on the scheduled FD reception in the received DCI. In one configuration, the apparatus 1702, and in particular the cellular baseband processor 1704, includes means for transmitting and receiving concurrently in the second set of symbols excluding the third set of symbols based on the scheduled FD transmission and FD reception in the received DCI. In one configuration, the apparatus 1702, and in particular the cellular baseband processor 1704, includes means for identifying that each symbol in the third set of symbols is a D symbol or an F symbol configured as D. The apparatus 1702, and in particular the cellular baseband processor 1704, includes means for receiving, based on the identification, in the second set of symbols based on the scheduled FD reception in the received DCI. The apparatus 1702, and in particular the cellular baseband processor 1704, includes means for canceling, based on the identification, the FD transmission in the second set of symbols based on the scheduled FD transmission in the received DCI. In one configuration, the apparatus 1702, and in particular the cellular baseband processor 1704, includes means for identifying that each symbol in the third set of symbols is a U symbol or an F symbol configured as U. The apparatus 1702, and in particular the cellular baseband processor 1704, includes means for transmitting, based on the identification, in the second set of symbols based on the scheduled FD transmission in the received DCI. The apparatus 1702, and in particular the cellular baseband processor 1704, includes means for canceling, based on the identification, the FD reception in the second set of symbols based on the scheduled FD reception in the received DCI. In one configuration, the apparatus 1702, and in particular the cellular baseband processor 1704, includes means for identifying that at least one symbol in the third set of symbols is a D symbol and that at least one symbol in the third set of symbols is a U symbol. The apparatus 1702, and in particular the cellular baseband processor 1704, includes means for canceling, based on the identification, the FD transmission and the FD reception in the second set of symbols based on the scheduled FD transmission and FD reception in the received DCI. In one configuration, the DCI may schedule the FD transmission and the FD reception with a same control information or data in each of a plurality of slots associated with slot aggregation, the second set of symbols may be within a first slot of the plurality of slots, and the canceling of the at least one of the FD transmission or the FD reception in the third set of symbols may be within the first slot and may be independent of remaining slots of the plurality of slots. In one configuration, the received configuration indicating that the first set of symbols is configured for HD communication may be received through RRC signaling. In one configuration, the apparatus 1702, and in particular the cellular baseband processor 1704, includes means for identifying that the third set of symbols have the conflicting HD and FD configurations due to each symbol of the third set of symbols being configured for the HD communication based on the received configuration and configured for the FD communication based on the received DCI.

The means may be one or more of the components of the apparatus 1702 configured to perform the functions recited by the means. As described supra, the apparatus 1702 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 18:
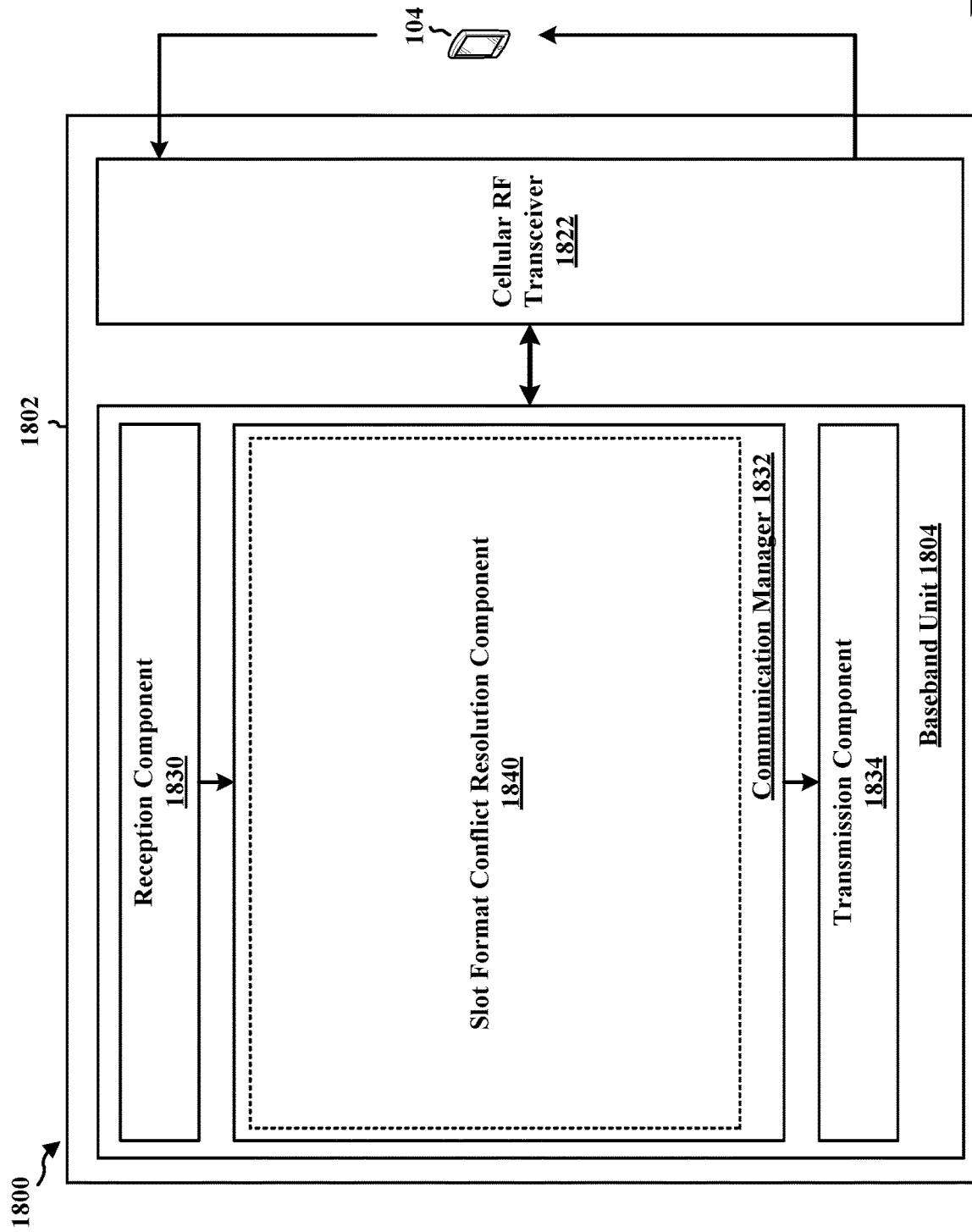
FIG. 18 is a diagram illustrating an example of a hardware implementation for an example apparatus.

FIG. 18 is a diagram 1800 illustrating an example of a hardware implementation for an apparatus 1802. The apparatus 1802 may be a base station, a component of a base station, or may implement base station functionality. In some aspects, the apparatus 1802 may include a baseband unit 1804. The baseband unit 1804 may communicate through a cellular RF transceiver 1822 with the UE 104. The baseband unit 1804 may include a computer-readable medium/memory. The baseband unit 1804 is responsible for general processing, including the execution of software stored on the computer-readable medium/memory. The software, when executed by the baseband unit 1804, causes the baseband unit 1804 to perform the various functions described supra. The computer-readable medium/memory may also be used for storing data that is manipulated by the baseband unit 1804 when executing software. The baseband unit 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the baseband unit 1804. The baseband unit 1804 may be a component of the base station 310 and may include the memory 376 and/or at least one of the TX processor 316, the RX processor 370, and the controller/processor 375.

The transmission component 1834 is configured to transmit, to a UE, a configuration indicating that a first set of symbols is configured for HD communication with at least one of D symbols, U symbols, or F symbols in which the F symbols are configured as D or U, e.g., as described in connection with 1602. The transmission component 1834 is configured to transmit, to the UE, DCI scheduling FD communication including an FD transmission at the UE and an FD reception at the UE on a second set of symbols, e.g., as described in connection with 1604. The second set of symbols have a third set of symbols in common with the first set of symbols. The third set of symbols are a subset of the second set of symbols and have conflicting HD and FD configurations. The communication manager 1832 includes a slot format conflict resolution component 1840 that cancels, based on the conflicting HD and FD configurations of the third set of symbols, at least one of a reception by the BS in association with the FD transmission at the UE or a transmission by the BS in association with the FD reception at the UE in the third set of symbols, e.g., as described in connection with 1606.

The apparatus may include additional components that perform each of the blocks of the algorithm in the flowcharts of FIGS. 4 and 16. As such, each block in the flowcharts of FIGS. 4 and 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1802 may include a variety of components configured for various functions. In one configuration, the apparatus 1802, and in particular the baseband unit 1804, includes means for transmitting, to a UE, a configuration indicating that a first set of symbols is configured for HD communication with at least one of D symbols, U symbols, or F symbols in which the F symbols are configured as D or U. The apparatus 1802, and in particular the baseband unit 1804, includes means for transmitting, to the UE, DCI scheduling FD communication including an FD transmission at the UE and an FD reception at the UE on a second set of symbols, the second set of symbols having a third set of symbols in common with the first set of symbols, the third set of symbols being a subset of the second set of symbols and having conflicting HD and FD configurations. The apparatus 1802, and in particular the baseband unit 1804, includes means for canceling, based on the conflicting HD and FD configurations of the third set of symbols, at least one of a reception by the BS in association with the FD transmission at the UE or a transmission by the BS in association with the FD reception at the UE in the third set of symbols.

In one configuration, the means for canceling the at least one of the reception by the BS in association with the FD transmission at the UE or the transmission by the BS in association with the FD reception at the UE in the third set of symbols may be further configured to cancel both the reception by the BS in association with the FD transmission at the UE and the transmission by the BS in association with the FD reception at the UE in the second set of symbols. In one configuration, the means for canceling the at least one of the reception by the BS in association with the FD transmission at the UE or the transmission by the BS in association with the FD reception at the UE in the third set of symbols may be further configured to cancel the transmission by the BS in association with the FD reception at the UE on U symbols and F symbols configured as U of the third set of symbols. The apparatus 1802, and in particular the baseband unit 1804, includes means for receiving, from the UE, on the U symbols and the F symbols configured as U of the third set of symbols based on the scheduled FD transmission at the UE in the transmitted DCI. In one configuration, the apparatus 1802, and in particular the baseband unit 1804, includes means for transmitting and receiving concurrently in the second set of symbols excluding the third set of symbols based on the scheduled FD reception at the UE and the FD transmission at the UE, respectively, in the transmitted DCI. In one configuration, the means for canceling the at least one of the reception by the BS in association with the FD transmission at the UE or the transmission by the BS in association with the FD reception at the UE in the third set of symbols may be further configured to cancel the reception by the BS in association with the FD transmission at the UE on D symbols and F symbols configured as D of the third set of symbols. The apparatus 1802, and in particular the baseband unit 1804, includes means for transmitting, to the UE, on the D symbols and the F symbols configured as D of the third set of symbols based on the scheduled FD reception at the UE in the transmitted DCI. In one configuration, the apparatus 1802, and in particular the baseband unit 1804, includes means for transmitting and receiving concurrently in the second set of symbols excluding the third set of symbols based on the scheduled FD reception at the UE and the FD transmission at the UE, respectively, in the transmitted DCI. In one configuration, the apparatus 1802, and in particular the baseband unit 1804, includes means for identifying that each symbol in the third set of symbols is a D symbol or an F symbol configured as D. The apparatus 1802, and in particular the baseband unit 1804, includes means for transmitting, to the UE based on the identification, in the second set of symbols based on the scheduled FD reception at the UE in the transmitted DCI. The apparatus 1802, and in particular the baseband unit 1804, includes means for canceling, based on the identification, the reception by the BS in association with the FD transmission at the UE in the second set of symbols based on the scheduled FD transmission at the UE in the transmitted DCI. In one configuration, the apparatus 1802, and in particular the baseband unit 1804, includes means for identifying that each symbol in the third set of symbols is a U symbol or an F symbol configured as U. The apparatus 1802, and in particular the baseband unit 1804, includes means for receiving, from the UE based on the identification, in the second set of symbols based on the scheduled FD transmission at the UE in the transmitted DCI. The apparatus 1802, and in particular the baseband unit 1804, includes means for canceling, based on the identification, the transmission by the BS in association with the FD reception at the UE in the second set of symbols based on the scheduled FD reception at the UE in the transmitted DCI. In one configuration, the apparatus 1802, and in particular the baseband unit 1804, includes means for identifying that at least one symbol in the third set of symbols is a D symbol and that at least one symbol in the third set of symbols is a U symbol. The apparatus 1802, and in particular the baseband unit 1804, includes means for canceling, based on the identification, the reception by the BS in association with the FD transmission at the UE and the transmission by the BS in association with the FD reception at the UE in the second set of symbols based on the scheduled FD transmission at the UE and FD reception at the UE in the transmitted DCI. In one configuration, the DCI may schedule the FD transmission at the UE and the FD reception at the UE with a same control information or data in each of a plurality of slots associated with slot aggregation, the second set of symbols may be within a first slot of the plurality of slots, and the canceling of the at least one of the reception by the BS in association with the FD transmission at the UE or transmission by the BS in association with the FD reception at the UE in the third set of symbols may be within the first slot and may be independent of remaining slots of the plurality of slots. In one configuration, the transmitted configuration indicating that the first set of symbols is configured for HD communication may be transmitted through RRC signaling. In one configuration, the apparatus 1802, and in particular the baseband unit 1804, includes means for identifying that the third set of symbols have the conflicting HD and FD configurations due to each symbol of the third set of symbols being configured for the HD communication based on the transmitted configuration and configured for the FD communication based on the transmitted DCI.

The means may be one or more of the components of the apparatus 1802 configured to perform the functions recited by the means. As described supra, the apparatus 1802 may include the TX Processor 316, the RX Processor 370, and the controller/processor 375. As such, in one configuration, the means may be the TX Processor 316, the RX Processor 370, and the controller/processor 375 configured to perform the functions recited by the means.

Referring again to FIGS. 4-14, a method and an apparatus for resolution of conflicts between HD and FD slot format configurations are disclosed. The aforementioned specifications for resolving the conflicts between HD and FD slot format configurations may be utilized for the proper operation of FD communication systems.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative and may be combined with other aspects or teachings described herein, without limitation.

Aspect 1 is an apparatus for wireless communication at a UE including at least one processor coupled to a memory and configured to receive a configuration indicating that a first set of symbols is configured for HD communication with at least one of D symbols, U symbols, or F symbols in which the F symbols are configured as D or U; receive DCI scheduling FD communication including an FD transmission and an FD reception on a second set of symbols, the second set of symbols having a third set of symbols in common with the first set of symbols, the third set of symbols being a subset of the second set of symbols and having conflicting HD and FD configurations; and cancel, based on the conflicting HD and FD configurations of the third set of symbols, at least one of the FD transmission or the FD reception in the third set of symbols.

Aspect 2 is the apparatus of aspect 1, where to cancel the at least one of the FD transmission or the FD reception in the third set of symbols, the at least one processor is further configured to cancel both the FD transmission and the FD reception in the second set of symbols.

Aspect 3 is the apparatus of aspect 1, where to cancel the at least one of the FD transmission or the FD reception in the third set of symbols, the at least one processor is further configured to cancel the FD reception on U symbols and F symbols configured as U of the third set of symbols, and the at least one processor is further configured to transmit on the U symbols and the F symbols configured as U of the third set of symbols based on the scheduled FD transmission in the received DCI.

Aspect 4 is the apparatus of aspect 3, where the at least one processor is further configured to transmit and receive concurrently in the second set of symbols excluding the third set of symbols based on the scheduled FD transmission and FD reception in the received DCI.

Aspect 5 is the apparatus of aspect 1, where to cancel the at least one of the FD transmission or the FD reception in the third set of symbols, the at least one processor is further configured to cancel the FD transmission on D symbols and F symbols configured as D of the third set of symbols, and the at least one processor is further configured to receive on the D symbols and the F symbols configured as D of the third set of symbols based on the scheduled FD reception in the received DCI.

Aspect 6 is the apparatus of aspect 5, where the at least one processor is further configured to transmit and receive concurrently in the second set of symbols excluding the third set of symbols based on the scheduled FD transmission and FD reception in the received DCI.

Aspect 7 is the apparatus of aspect 1, where the at least one processor is further configured to identify that each symbol in the third set of symbols is a D symbol or an F symbol configured as D; receive, based on the identification, in the second set of symbols based on the scheduled FD reception in the received DCI; and cancel, based on the identification, the FD transmission in the second set of symbols based on the scheduled FD transmission in the received DCI.

Aspect 8 is the apparatus of aspect 1, where the at least one processor is further configured to identify that each symbol in the third set of symbols is a U symbol or an F symbol configured as U; transmit, based on the identification, in the second set of symbols based on the scheduled FD transmission in the received DCI; and cancel, based on the identification, the FD reception in the second set of symbols based on the scheduled FD reception in the received DCI.

Aspect 9 is the apparatus of aspect 1, where the at least one processor is further configured to identify that at least one symbol in the third set of symbols is a D symbol and that at least one symbol in the third set of symbols is a U symbol; and cancel, based on the identification, the FD transmission and the FD reception in the second set of symbols based on the scheduled FD transmission and FD reception in the received DCI.

Aspect 10 is the apparatus of aspect 1, where the DCI schedules the FD transmission and the FD reception with a same control information or data in each of a plurality of slots associated with slot aggregation, the second set of symbols is within a first slot of the plurality of slots, and the canceling of the at least one of the FD transmission or the FD reception in the third set of symbols is within the first slot and is independent of remaining slots of the plurality of slots.

Aspect 11 is the apparatus of any of aspects 1 to 10, where the received configuration indicating that the first set of symbols is configured for HD communication is received through RRC signaling.

Aspect 12 is the apparatus of any of aspects 1 to 11, where the at least one processor is further configured to identify that the third set of symbols have the conflicting HD and FD configurations due to each symbol of the third set of symbols being configured for the HD communication based on the received configuration and configured for the FD communication based on the received DCI.

Aspect 13 is the apparatus of any of aspects 1 to 12, further including a transceiver coupled to the at least one processor.

Aspect 14 is an apparatus for wireless communication at a base station including at least one processor coupled to a memory and configured to transmit, to a UE, a configuration indicating that a first set of symbols is configured for HD communication with at least one of D symbols, U symbols, or F symbols in which the F symbols are configured as D or U; transmit, to the UE, DCI scheduling FD communication including an FD transmission at the UE and an FD reception at the UE on a second set of symbols, the second set of symbols having a third set of symbols in common with the first set of symbols, the third set of symbols being a subset of the second set of symbols and having conflicting HD and FD configurations; and cancel, based on the conflicting HD and FD configurations of the third set of symbols, at least one of a reception by the BS in association with the FD transmission at the UE or a transmission by the BS in association with the FD reception at the UE in the third set of symbols.

Aspect 15 is the apparatus of aspect 14, where to cancel the at least one of the reception by the BS in association with the FD transmission at the UE or the transmission by the BS in association with the FD reception at the UE in the third set of symbols, the at least one processor is further configured to cancel both the reception by the BS in association with the FD transmission at the UE and the transmission by the BS in association with the FD reception at the UE in the second set of symbols.

Aspect 16 is the apparatus of aspect 14, where to cancel the at least one of the reception by the BS in association with the FD transmission at the UE or the transmission by the BS in association with the FD reception at the UE in the third set of symbols, the at least one processor is further configured to cancel the transmission by the BS in association with the FD reception at the UE on U symbols and F symbols configured as U of the third set of symbols, and the at least one processor is further configured to receive, from the UE, on the U symbols and the F symbols configured as U of the third set of symbols based on the scheduled FD transmission at the UE in the transmitted DCI.

Aspect 17 is the apparatus of aspect 16, where the at least one processor is further configured to transmit and receive concurrently in the second set of symbols excluding the third set of symbols based on the scheduled FD reception at the UE and the FD transmission at the UE, respectively, in the transmitted DCI.

Aspect 18 is the apparatus of aspect 14, where to cancel the at least one of the reception by the BS in association with the FD transmission at the UE or the transmission by the BS in association with the FD reception at the UE in the third set of symbols, the at least one processor is further configured to cancel the reception by the BS in association with the FD transmission at the UE on D symbols and F symbols configured as D of the third set of symbols, and the at least one processor is further configured to transmit, to the UE, on the D symbols and the F symbols configured as D of the third set of symbols based on the scheduled FD reception at the UE in the transmitted DCI.

Aspect 19 is the apparatus of aspect 18, where the at least one processor is further configured to transmit and receive concurrently in the second set of symbols excluding the third set of symbols based on the scheduled FD reception at the UE and the FD transmission at the UE, respectively, in the transmitted DCI.

Aspect 20 is the apparatus of aspect 14, where the at least one processor is further configured to identify that each symbol in the third set of symbols is a D symbol or an F symbol configured as D; transmit, to the UE based on the identification, in the second set of symbols based on the scheduled FD reception at the UE in the transmitted DCI; and cancel, based on the identification, the reception by the BS in association with the FD transmission at the UE in the second set of symbols based on the scheduled FD transmission at the UE in the transmitted DCI.

Aspect 21 is the apparatus of aspect 14, where the at least one processor is further configured to identify that each symbol in the third set of symbols is a U symbol or an F symbol configured as U; receive, from the UE based on the identification, in the second set of symbols based on the scheduled FD transmission at the UE in the transmitted DCI; and cancel, based on the identification, the transmission by the BS in association with the FD reception at the UE in the second set of symbols based on the scheduled FD reception at the UE in the transmitted DCI.

Aspect 22 is the apparatus of aspect 14, where the at least one processor is further configured to identify that at least one symbol in the third set of symbols is a D symbol and that at least one symbol in the third set of symbols is a U symbol; and cancel, based on the identification, the reception by the BS in association with the FD transmission at the UE and the transmission by the BS in association with the FD reception at the UE in the second set of symbols based on the scheduled FD transmission at the UE and FD reception at the UE in the transmitted DCI.

Aspect 23 is the apparatus of aspect 14, where the DCI schedules the FD transmission at the UE and the FD reception at the UE with a same control information or data in each of a plurality of slots associated with slot aggregation, the second set of symbols is within a first slot of the plurality of slots, and the canceling of the at least one of the reception by the BS in association with the FD transmission at the UE or transmission by the BS in association with the FD reception at the UE in the third set of symbols is within the first slot and is independent of remaining slots of the plurality of slots.

Aspect 24 is the apparatus of any of aspects 14 to 23, where the transmitted configuration indicating that the first set of symbols is configured for HD communication is transmitted through RRC signaling.

Aspect 25 is the apparatus of any of aspects 14 to 24, where the at least one processor is further configured to identify that the third set of symbols have the conflicting HD and FD configurations due to each symbol of the third set of symbols being configured for the HD communication based on the transmitted configuration and configured for the FD communication based on the transmitted DCI.

Aspect 26 is the apparatus of any of aspects of 14 to 25, further including a transceiver coupled to the at least one processor.

Aspect 27 is a method of wireless communication for implementing any of aspects 1 to 26.

Aspect 28 is an apparatus for wireless communication including means for implementing any of aspects 1 to 26.

Aspect 29 is a computer-readable medium storing computer executable code, where the code when executed by a processor causes the processor to implement any of aspects 1 to 26.

What is claimed is:

1. An apparatus for wireless communication at a user equipment (UE), comprising:
   memory; and
   at least one processor coupled to the memory and configured to:
   receive a configuration indicating that a first set of symbols is configured for half-duplex (HD) communication with at least one of downlink (D) symbols, uplink (U) symbols, or flexible (F) symbols in which the F symbols are configured as D or U;
   receive downlink control information (DCI) scheduling full-duplex (FD) communication including an FD transmission and an FD reception on a second set of symbols, the second set of symbols having a third set of symbols in common with the first set of symbols, the third set of symbols being a subset of the second set of symbols and having conflicting HD and FD configurations, wherein the first set of symbols and the second set of symbols are associated with different beams; and
   cancel, based on the conflicting HD and FD configurations of the third set of symbols, at least one of the FD transmission or the FD reception in the third set of symbols.

2. The apparatus of claim 1, wherein to cancel the at least one of the FD transmission or the FD reception in the third set of symbols, the at least one processor is further configured to cancel both the FD transmission and the FD reception in the second set of symbols.

3. The apparatus of claim 1, wherein to cancel the at least one of the FD transmission or the FD reception in the third set of symbols, the at least one processor is further configured to cancel the FD reception on U symbols and F symbols configured as U of the third set of symbols, and the at least one processor is further configured to:
   transmit on the U symbols and the F symbols configured as U of the third set of symbols based on the scheduled FD transmission in the received DCI.

4. The apparatus of claim 3, the at least one processor being further configured to:
   transmit and receive concurrently in the second set of symbols excluding the third set of symbols based on the scheduled FD transmission and FD reception in the received DCI.

5. The apparatus of claim 1, wherein to cancel the at least one of the FD transmission or the FD reception in the third set of symbols, the at least one processor is further configured to cancel the FD transmission on D symbols and F symbols configured as D of the third set of symbols, and the at least one processor is further configured to:
   receive on the D symbols and the F symbols configured as D of the third set of symbols based on the scheduled FD reception in the received DCI.

6. The apparatus of claim 5, the at least one processor being further configured to:

transmit and receive concurrently in the second set of symbols excluding the third set of symbols based on the scheduled FD transmission and FD reception in the received DCI.

7. The apparatus of claim 1, the at least one processor being further configured to:
identify that each symbol in the third set of symbols is a D symbol or an F symbol configured as D;
receive, based on the identification, in the second set of symbols based on the scheduled FD reception in the received DCI; and
cancel, based on the identification, the FD transmission in the second set of symbols based on the scheduled FD transmission in the received DCI.

8. The apparatus of claim 1, the at least one processor being further configured to:
identify that each symbol in the third set of symbols is a U symbol or an F symbol configured as U;
transmit, based on the identification, in the second set of symbols based on the scheduled FD transmission in the received DCI; and
cancel, based on the identification, the FD reception in the second set of symbols based on the scheduled FD reception in the received DCI.

9. The apparatus of claim 1, the at least one processor being further configured to:
identify that at least one symbol in the third set of symbols is a D symbol and that at least one symbol in the third set of symbols is a U symbol; and
cancel, based on the identification, the FD transmission and the FD reception in the second set of symbols based on the scheduled FD transmission and FD reception in the received DCI.

10. The apparatus of claim 1, wherein the DCI schedules the FD transmission and the FD reception with a same control information or data in each of a plurality of slots associated with slot aggregation, the second set of symbols is within a first slot of the plurality of slots, and the canceling of the at least one of the FD transmission or the FD reception in the third set of symbols is within the first slot and is independent of remaining slots of the plurality of slots.

11. The apparatus of claim 1, wherein to receive the configuration indicating that the first set of symbols is configured for HD communication, the at least one processor is configured to receive the configuration through radio resource control (RRC) signaling.

12. The apparatus of claim 1, the at least one processor being further configured to:
identify that the third set of symbols have the conflicting HD and FD configurations due to each symbol of the third set of symbols being configured for the HD communication based on the received configuration and configured for the FD communication based on the received DCI.

13. The apparatus of claim 1, further comprising a transceiver coupled to the at least one processor.

14. A method of wireless communication of a user equipment (UE), comprising:
receiving a configuration indicating that a first set of symbols is configured for half-duplex (HD) communication with at least one of downlink (D) symbols, uplink (U) symbols, or flexible (F) symbols in which the F symbols are configured as D or U;
receiving downlink control information (DCI) scheduling full-duplex (FD) communication including an FD transmission and an FD reception on a second set of symbols, the second set of symbols having a third set of symbols in common with the first set of symbols, the third set of symbols being a subset of the second set of symbols and having conflicting HD and FD configurations, wherein the first set of symbols and the second set of symbols are associated with different beams; and
canceling, based on the conflicting HD and FD configurations of the third set of symbols, at least one of the FD transmission or the FD reception in the third set of symbols.

15. The method of claim 14, wherein the canceling the at least one of the FD transmission or the FD reception in the third set of symbols comprises canceling both the FD transmission and the FD reception in the second set of symbols.

16. An apparatus for wireless communication at a base station (BS), comprising:
memory; and
at least one processor coupled to the memory and configured to:
transmit, to a user equipment (UE), a configuration indicating that a first set of symbols is configured for half-duplex (HD) communication with at least one of downlink (D) symbols, uplink (U) symbols, or flexible (F) symbols in which the F symbols are configured as D or U;
transmit, to the UE, downlink control information (DCI) scheduling full-duplex (FD) communication including an FD transmission at the UE and an FD reception at the UE on a second set of symbols, the second set of symbols having a third set of symbols in common with the first set of symbols, the third set of symbols being a subset of the second set of symbols and having conflicting HD and FD configurations, wherein the first set of symbols and the second set of symbols are associated with different beams; and
cancel, based on the conflicting HD and FD configurations of the third set of symbols, at least one of a reception by the BS in association with the FD transmission at the UE or a transmission by the BS in association with the FD reception at the UE in the third set of symbols.

17. The apparatus of claim 16, wherein to cancel the at least one of the reception by the BS in association with the FD transmission at the UE or the transmission by the BS in association with the FD reception at the UE in the third set of symbols, the at least one processor is further configured to cancel both the reception by the BS in association with the FD transmission at the UE and the transmission by the BS in association with the FD reception at the UE in the second set of symbols.

18. The apparatus of claim 16, wherein to cancel the at least one of the reception by the BS in association with the FD transmission at the UE or the transmission by the BS in association with the FD reception at the UE in the third set of symbols, the at least one processor is further configured to cancel the transmission by the BS in association with the FD reception at the UE on U symbols and F symbols configured as U of the third set of symbols, and the at least one processor is further configured to:
receive, from the UE, on the U symbols and the F symbols configured as U of the third set of symbols based on the scheduled FD transmission at the UE in the transmitted DCI.

19. The apparatus of claim 18, the at least one processor being further configured to:

transmit and receive concurrently in the second set of symbols excluding the third set of symbols based on the scheduled FD reception at the UE and the FD transmission at the UE, respectively, in the transmitted DCI.

20. The apparatus of claim 16, wherein to cancel the at least one of the reception by the BS in association with the FD transmission at the UE or the transmission by the BS in association with the FD reception at the UE in the third set of symbols, the at least one processor is further configured to cancel the reception by the BS in association with the FD transmission at the UE on D symbols and F symbols configured as D of the third set of symbols, and the at least one processor is further configured to:
 transmit, to the UE, on the D symbols and the F symbols configured as D of the third set of symbols based on the scheduled FD reception at the UE in the transmitted DCI.

21. The apparatus of claim 20, the at least one processor being further configured to:
 transmit and receive concurrently in the second set of symbols excluding the third set of symbols based on the scheduled FD reception at the UE and the FD transmission at the UE, respectively, in the transmitted DCI.

22. The apparatus of claim 16, the at least one processor being further configured to:
 identify that each symbol in the third set of symbols is a D symbol or an F symbol configured as D;
 transmit, to the UE based on the identification, in the second set of symbols based on the scheduled FD reception at the UE in the transmitted DCI; and
 cancel, based on the identification, the reception by the BS in association with the FD transmission at the UE in the second set of symbols based on the scheduled FD transmission at the UE in the transmitted DCI.

23. The apparatus of claim 16, the at least one processor being further configured to:
 identify that each symbol in the third set of symbols is a U symbol or an F symbol configured as U;
 receive, from the UE based on the identification, in the second set of symbols based on the scheduled FD transmission at the UE in the transmitted DCI; and
 cancel, based on the identification, the transmission by the BS in association with the FD reception at the UE in the second set of symbols based on the scheduled FD reception at the UE in the transmitted DCI.

24. The apparatus of claim 16, the at least one processor being further configured to:
 identify that at least one symbol in the third set of symbols is a D symbol and that at least one symbol in the third set of symbols is a U symbol; and
 cancel, based on the identification, the reception by the BS in association with the FD transmission at the UE and the transmission by the BS in association with the FD reception at the UE in the second set of symbols based on the scheduled FD transmission at the UE and FD reception at the UE in the transmitted DCI.

25. The apparatus of claim 16, wherein the DCI schedules the FD transmission at the UE and the FD reception at the UE with a same control information or data in each of a plurality of slots associated with slot aggregation, the second set of symbols is within a first slot of the plurality of slots, and the canceling of the at least one of the reception by the BS in association with the FD transmission at the UE or transmission by the BS in association with the FD reception at the UE in the third set of symbols is within the first slot and is independent of remaining slots of the plurality of slots.

26. The apparatus of claim 16, wherein to transmit the configuration indicating that the first set of symbols is configured for HD communication, the at least one processor is configured to transmit the configuration through radio resource control (RRC) signaling.

27. The apparatus of claim 16, the at least one processor being further configured to:
 identify that the third set of symbols have the conflicting HD and FD configurations due to each symbol of the third set of symbols being configured for the HD communication based on the transmitted configuration and configured for the FD communication based on the transmitted DCI.

28. The apparatus of claim 16, further comprising a transceiver coupled to the at least one processor.

29. A method of wireless communication of a base station (BS), comprising:
 transmitting, to a user equipment (UE), a configuration indicating that a first set of symbols is configured for half-duplex (HD) communication with at least one of downlink (D) symbols, uplink (U) symbols, or flexible (F) symbols in which the F symbols are configured as D or U;
 transmitting, to the UE, downlink control information (DCI) scheduling full-duplex (FD) communication including an FD transmission at the UE and an FD reception at the UE on a second set of symbols, the second set of symbols having a third set of symbols in common with the first set of symbols, the third set of symbols being a subset of the second set of symbols and having conflicting HD and FD configurations, wherein the first set of symbols and the second set of symbols are associated with different beams; and
 canceling, based on the conflicting HD and FD configurations of the third set of symbols, at least one of a reception by the BS in association with the FD transmission at the UE or a transmission by the BS in association with the FD reception at the UE in the third set of symbols.

30. The method of claim 29, wherein the canceling the at least one of the reception by the BS in association with the FD transmission at the UE or the transmission by the BS in association with the FD reception at the UE in the third set of symbols comprises canceling both the reception by the BS in association with the FD transmission at the UE and the transmission by the BS in association with the FD reception at the UE in the second set of symbols.

* * * * *